United States Patent
Meneses et al.

(10) Patent No.: US 9,358,454 B2
(45) Date of Patent: Jun. 7, 2016

(54) AUDIO HEADSET SYSTEM AND APPARATUS

(71) Applicant: Performance Designed Products LLC, Sherman Oaks, CA (US)

(72) Inventors: Antonio Meneses, San Diego, CA (US); Gerard Lambert Block, West Hollywood, CA (US); Scott Michael Terrell, La Mesa, CA (US); Thomas John Roberts, Alpine, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 225 days.

(21) Appl. No.: 14/025,694

(22) Filed: Sep. 12, 2013

(65) Prior Publication Data
US 2014/0073429 A1 Mar. 13, 2014

Related U.S. Application Data

(60) Provisional application No. 61/700,768, filed on Sep. 13, 2012.

(51) Int. Cl.
*A63F 9/24* (2006.01)
*A63F 13/98* (2014.01)
*H04S 3/00* (2006.01)

(52) U.S. Cl.
CPC ................. *A63F 13/02* (2013.01); *H04S 3/004* (2013.01); *A63F 2300/6063* (2013.01)

(58) Field of Classification Search
None
See application file for complete search history.

(56) References Cited

U.S. PATENT DOCUMENTS

| 6,021,206 | A | * | 2/2000 | McGrath | 381/310 |
| 2003/0161479 | A1 | | 8/2003 | Yang et al. | |
| 2005/0068571 | A1 | * | 3/2005 | Hart | H04N 1/00283 358/1.15 |
| 2005/0124414 | A1 | * | 6/2005 | Hussaini et al. | 463/35 |
| 2009/0286600 | A1 | * | 11/2009 | Hideya | 463/35 |
| 2011/0065509 | A1 | * | 3/2011 | Rom | A63F 13/02 463/37 |
| 2011/0130203 | A1 | * | 6/2011 | Reiss | A63F 13/12 463/35 |
| 2011/0200217 | A1 | * | 8/2011 | Gurin | A61B 5/123 381/320 |
| 2012/0016208 | A1 | * | 1/2012 | Janssen | G06F 17/30764 600/300 |
| 2012/0052948 | A1 | * | 3/2012 | Soelberg et al. | 463/35 |
| 2012/0122577 | A1 | * | 5/2012 | Aronzon | A63F 13/02 463/36 |
| 2013/0058494 | A1 | * | 3/2013 | Kim et al. | 381/74 |

FOREIGN PATENT DOCUMENTS

WO 2009/111798 9/2009

OTHER PUBLICATIONS

International Search Report and the Written Opinion for International App No. PCT/US2013/059689, mailed Nov. 11, 2013, Authorized Officer: Wagner, Judit.
Ludwig L F et al., Extending the Notion of a Window System to Audio, Computer IEEE, Aug. 1, 1990, pp. 66-72. US.

* cited by examiner

*Primary Examiner* — Jason Yen
(74) *Attorney, Agent, or Firm* — Sheppard Mullin Richter & Hampton LLP

(57) ABSTRACT

According to one embodiment of the technology described herein, a audio headset system is provided, comprising: a speaker; a signal processor configured to process source audio received from an audio source, to produce processed audio from the source audio, and to output the processed audio to the speaker; and a control unit configured to control operation of the signal processor according to an audio profile, wherein the audio profile causes the signal processor to selectively mix, delay, phase shift, and equalize the source audio, thereby producing processed audio.

23 Claims, 17 Drawing Sheets

AUDIO HEADSET SYSTEM AND APPARATUS

CROSS-REFERENCE TO RELATED APPLICATIONS

This application claims the benefit of U.S. Provisional Patent Application Ser. No. 61/700,768, filed Sep. 13, 2012, entitled "Audio Headset System and Apparatus," which is hereby incorporated herein by reference.

TECHNICAL FIELD

The technology described herein relates to audio systems, and more particularly, some embodiments relate to headsets configured with sound processing.

DESCRIPTION OF THE RELATED ART

Interactive software programs, such as video games and the like, typically allow the user (e.g., a player of a video game, otherwise known as a gamer) to interact with the software program using a variety of peripherals.

For example, for today's typical desktop or laptop computer, a popular form of user input is through a keyboard and mouse. Within the realm of video games, the preferred form of input is through use of a game controller of one form or another. In one example, a controller might be a handheld controller that has input features such as a plurality of buttons, analog joysticks, a D-pad directional control, motion sensors (e.g., accelerometers), as well as others that provide a means for a gamer (i.e., video game player) to input desired control commands to the video game software. In turn, the inputted control commands would typically affect the game activity on the video screen. Example controllers include those for a Sony® PlayStation®, Microsoft® XBOX 360®, or Nintendo® Wii® gaming console, which are connected to the gaming console through a wire or wirelessly and comprises multiple buttons (for example X, O, Δ, or X, A, B, Y buttons, trigger buttons) and directional inputs (e.g., analog joysticks, four-way D-Pads). Other video game controllers include those built into hand-held game systems (e.g., Nintendo DS®, Sony® PSP®). For some of these controllers, such as the controllers for the Nintendo® Wii® gaming console, the controllers are also equipped with sensors that allow the gaming console to detect, among other things, when a controller is moving, in what manner a controller is moving, and the location of a controller with respect to a display output device. Such features enhance the gaming experience by increasing the level interaction between a gamer and a gaming console.

Another important aspect of the interaction is the audio of the video game. Typically, video game audio (also referred to herein as "game audio") includes audio generated by a video game, usually during game play, and may also include musical soundtracks, sound effects and other audio that accompanies the game play. The importance of game audio during game play for a particular video game may depend on the video game type or the type of gamer interactions involved during game play. For example, in certain types of video games, such as puzzles, game audio may serve to enhance the game play but may not be crucial for proper gamer interaction with the video game. In contrast, certain video games, such as music-based games, are substantially or entirely audio-based, and game audio is integral to game play and necessary for proper gamer interaction.

Then there are those video games that are in the middle of these two types of video games, where game audio is not necessary during game play but can play an important or even crucial role in achieving favorable results in the video game. For example, while playing a first-person shooter, the ability for a gamer to hear sounds of his or her surrounding environment may be important. Such sounds might include, for example, footsteps of approaching enemies, weapons fire, doors opening, vehicles and other game audio. These sounds could be important in anticipating a gamer's next move, determining what a gamer's next response will be in the video game, or when the gamer's next response in the video game will be performed (i.e., determine the gamer's response time). For example, in a first-person shooter, when a gamer hears footsteps approaching from behind, the gamer may react by turning their character around to investigate. As another example, while playing a driving simulator, the ability for a gamer to hear the engine revolutions during game play could be beneficial in assisting the gamer in timing gear shifts. Accordingly, in video games where game audio plays a role in gamer interaction, gamers could benefit from game audio that is enhanced in accordance with the video game being played.

BRIEF SUMMARY OF EMBODIMENTS

The present application provides for systems, methods, and apparatuses relating to audio headsets having sound processing. According to one embodiment of the technology described herein, an audio headset system is provided, comprising: a speaker; a signal processor configured to process source audio received from an audio source, to produce processed audio from the source audio, and to output the processed audio to the speaker; and a control unit configured to control operation of the signal processor according to an audio profile (also known as a sound profile), wherein the audio profile causes the signal processor to selectively mix, delay, phase shift, three dimensionally expand (i.e., 3D expand) and equalize the source audio, thereby producing processed audio.

Depending on the embodiment, the audio source may be a video gaming console or a computer. For some of those embodiments where the audio source is a video gaming console or a computer, the audio headset system may be entirely powered by such video game console or computer. For example, the audio headset system may be powered by way of a Universal Serial Bus (USB) connection with the video game console or computer, which may also be providing the audio headset system with audio data.

In some embodiments, the audio headset system selectively mixes, delays, phase shifts, and equalizes by, for example: equalizing a frequency response characteristic of a band in the source audio according to the audio profile, thereby producing a first equalized audio; filtering and mixing the first equalized audio according to the audio profile, thereby producing a first mixed audio; delaying and phase shifting the first mixed audio according to the audio profile, thereby producing a first delay shifted audio; equalizing a second frequency response characteristic of a second band in the first delay shifted audio according to the audio profile, thereby producing a second equalized audio; mixing the second equalized audio, thereby producing a second mixed audio; equalizing a third frequency response characteristic of a third band in the second mixed audio, thereby a third equalized audio; and mixing the third equalized audio, thereby producing the processed audio.

In some embodiments, the audio profile corresponds to a specific game title or a specific game type, and comprises settings that cause the signal processor to enhance audio during game play. For example, the audio profile may cause the signal processor to provide three-dimensional (3D) audio as the processed audio.

Depending on the embodiment, the source audio may comprise a plurality of audio channels that the signal processor converts into processed audio. The processed audio may comprise a left processed audio channel and a right processed audio channel. For example, in embodiments where the speaker of the audio headset system includes a left speaker and a right speaker, the processed audio may comprise a left processed audio channel to be outputted to the left speaker, and a right processed audio channel to be outputted to the right speaker.

In order to store the audio profile, and possibly other data, on the audio headset system, in some embodiments, the audio headset system further comprises a computer readable medium used to store and retrieve the audio profile and other data used by the audio headset system to operate. For example, the control unit may be further configured to retrieve and use audio profiles from the computer readable medium, to receive audio profiles from a computing device and store such audio profiles on the computer readable medium, or to transmit the audio profile from the computer readable medium to the computing device. With such features, some embodiments of the present technology allow users of the audio headset system to download or create new audio profiles on a personal computer, and upload such audio profiles to the audio headset system for use. Such embodiments could also allow users of the audio headset system to retrieve audio profiles stored on the audio headset system and save them (e.g., backup) to a personal computer.

In further embodiments, the audio headset system further comprises a microphone. The microphone may be provided to the user through a boom, which may be attached to the housing of at least one of the speakers. In embodiments having a microphone, the signal processor may be further configured to relay chat audio from the microphone to a game console or a computer. In other embodiments, the signal processor may be further configured to process microphone audio (i.e., chat audio) from the microphone before relaying the microphone audio to a game console (e.g., to process chat audio before transmitting it to other gamers in the video game, or suppress background noise picked up by the microphone). Additionally, the audio headset system may be configured to connect to a game controller that is in communication with the gaming console, and the control unit may be further configured to detect when the audio headset system is connected to the game controller, and instruct the signal processor to relay microphone audio (i.e., chat audio) from the microphone to the game console via the game controller.

In other embodiments, the signal processor is further configured to relay chat audio from the game console to the speaker. In some such embodiments, the audio headset system may be configured to connect to a game controller that is in communication with the gaming console, and the control unit may be further configured to detect when the audio headset system is connected to the game controller, and instruct the signal processor to mix chat audio with processed audio before the processed audio is output to the speaker.

In additional embodiments, the audio headset system further comprises an input component (e.g., buttons, switches, knobs, touch pad) configured to allow a user to select from a plurality of audio profiles, to currently apply to the source audio, to adjust a current audio profile, or to enable or disable application of the audio profile. In further embodiments, the audio headset system further comprises an auxiliary audio input configured to receive a secondary source audio and output the secondary source audio to the speaker as unprocessed audio. For example, auxiliary audio may be mixed with processed audio before being outputted to the speakers (e.g., possibly mixed using the DSP) or replace the source audio altogether (e.g., based on user preference). To assist a user in operating the audio headset system, in some embodiments, the audio headset system further comprises a display configured to display operational parameters (e.g., volume settings, audio profile selection and settings, power on/off, auxiliary audio input on/off, etc.) of the audio headset system.

Depending on the embodiment, the arrangement and configuration of the components of the audio headset system may vary. For example, in some embodiments, the audio headset system comprises a headset, the headset comprising one or more speakers, the signal processor and the control unit. The headset may further comprise the user input components, and display for the audio headset system. The headset may further comprise the microphone, which may be provided to a user through a boom attached to the headset body (e.g., speaker housing).

For other embodiments, the audio headset system has a bifurcated configuration where, for example, the audio headset system comprises: a first signal processor configured to process source audio received from an audio source, produce processed audio, and output the processed audio to the speaker; and a second signal processor configured to receive digital audio from the audio source, decode the digital audio to analog audio, and output the analog audio to the first signal processor as source audio. With such a configuration, an embodiment is capable of pre-processing and decoding source audio outputted in known audio encoding formats before the sound audio is enhanced for output to the speakers of the audio headset system. Dolby Digital®, Dolby Digital® EX, Dolby Digital® Plus, and Dolby Digital® Live are some of the formats commonly outputted by game consoles. Depending on the embodiment, the first signal processor may be housed in a headset, the second signal processor may be housed in an external component (sometimes referred to herein as a "headset receiver unit" or just "receiver unit") separate from the headset, and the external component would connect between the audio source and the headset. The external component may be further configured to provide power from the audio source (e.g., game console) to the headset (e.g., external component connects to game console's USB port, and provides power from the USB port to the audio headset). The external component may also be controlled and operated either by the control unit that controls the first signal processor, or by a separate second control unit. As described herein, a bifurcated configuration could allow the headset to be more comfortable for the headset user (e.g., headset is less bulky and heavy by displacing components and audio source connections to a separate receiving unit), or allow the headset to connect to the audio source wirelessly when the audio source does not readily provide a wireless connection to the headset (e.g., the bifurcated system could use Bluetooth® to connect the headset to the audio source).

According to one embodiment of the technology described herein, a audio headset is provided, comprising: a speaker; a signal processor configured to process source audio received from an audio source, produce processed audio from the source audio, and output the processed audio to the speaker; and a control unit configured to control operation of the signal processor according to an audio profile, wherein the audio profile causes the signal processor to selectively mix, delay, phase shift, and equalize the source audio, thereby producing processed audio.

According to further embodiments, various operations described above are implemented as a method or using a computer module, which may be embedded in the audio headset system or existing external to the audio headset. For example, components of some embodiments may utilize a computer program product comprising a computer useable medium having computer program code embodied therein for controlling a sound and signal processing accordance with aspects of the technology as described herein.

Other features and aspects of the present technology will become apparent from the following detailed description, taken in conjunction with the accompanying drawings, which illustrate, by way of example, the features in accordance with embodiments of the technology described herein. The summary is not intended to limit the scope of the present technology, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the present technology to the precise form disclosed. It should be understood that the technology described herein can be practiced with modification and alteration, and that the technology described herein be limited only by the claims and the equivalents thereof.

DESCRIPTION OF EMBODIMENTS OF THE TECHNOLOGY

Figure 1:
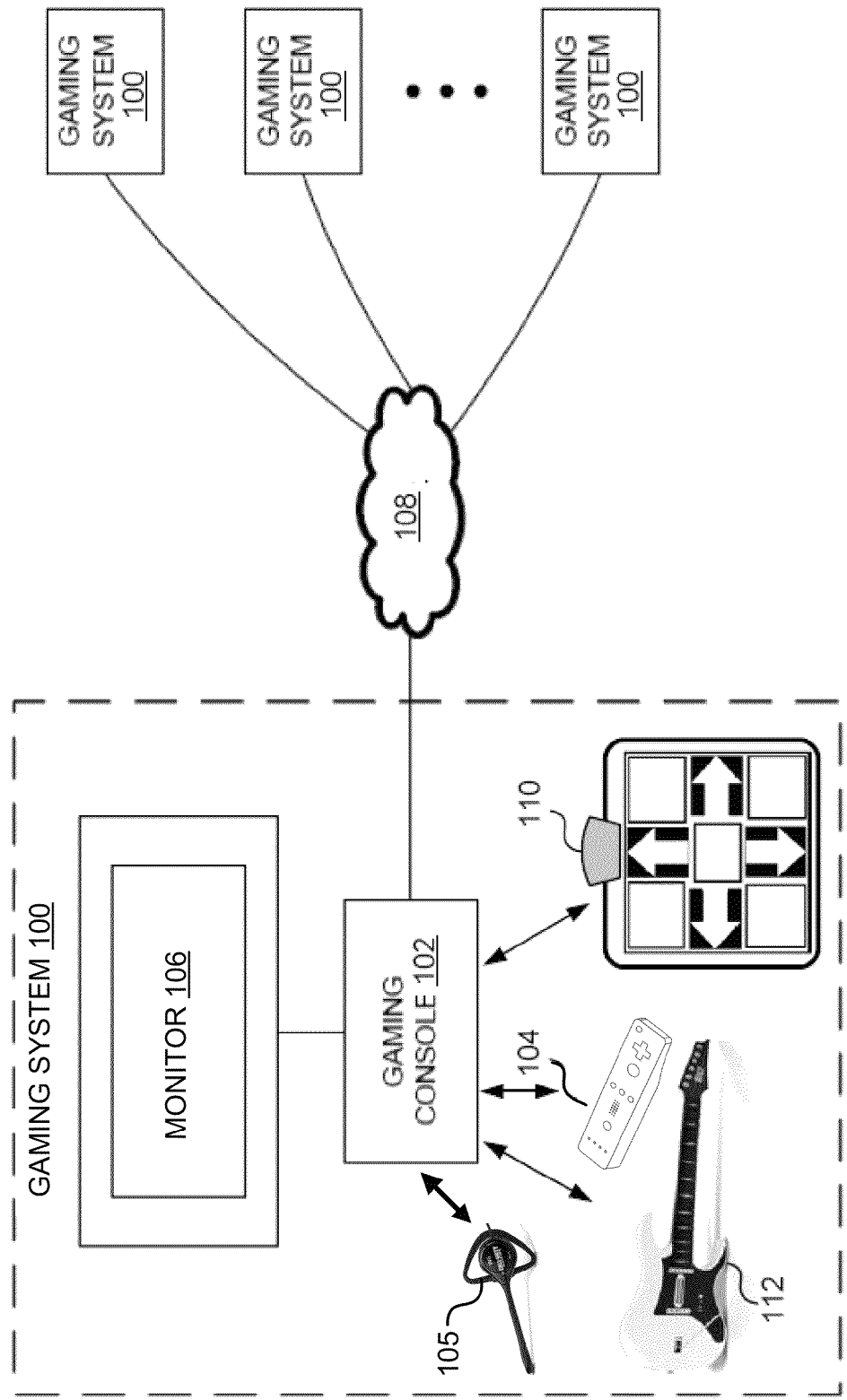
FIG. 1 is a block diagram illustrating a generalized version of a gaming system as one example of an environment with which the some embodiments of the technology disclosed herein can be implemented.

Embodiments of the present technology relate to an audio headset that includes audio processing or audio enhancement features. Before describing embodiments in detail, however, it is useful to describe a few example environments with which the embodiments can be implemented. One such example is that of a gaming system used by one or more video game players, or gamers, to play computer games or video games. FIG. 1 is a block diagram illustrating a generalized version of a gaming system 100 as one example of an environment with which the embodiments can be implemented. Referring now to FIG. 1, the example gaming system includes a gaming console 102, a monitor 106, and gaming controllers 104. The illustrated example also includes an interface to a communication medium or communication network 108 such as, for example, the internet or other communication channel.

In one environment, gaming console 102 might be implemented as a PlayStation®, Xbox®, GameCube®, Wii™ or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to display to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106.

Although not illustrated, speakers can also be provided, typically with monitor 106, to provide game audio to the gamer during game play and during set up. For example, the game audio may comprise a game soundtrack (i.e., music from the game), sounds generated during the game play (e.g., in a first-person-shooter, such sounds include footsteps, gunshots, and sounds generated by the game play environment; in a driving game, such sounds include noise from the player's car, noise generated by other players cars, noise from the track), or other audible information. Depending on the game console, the game audio may be outputted to a speaker built into the game console (e.g., such as in a handheld game console), or outputted to another device configured to receive the game audio and output it to a speaker. For example, in one embodiment, monitor 106 might be implemented as a television with built in speakers that is connected to the gaming console via a coaxial or other audio and video input. In another embodiment, game console 102 may be configured to output game audio to an audio receiver or amplifier (e.g., home stereo system) that, in turn, outputs the game audio to one or more speakers around the gamer.

Where game audio is outputted to another device for speaker output (e.g., output to a television with built in speakers, or audio receiver), game console 102 may output the game audio as analog audio or digital audio. For example, for analog audio, game console 102 may be configured with a 3.5 mm TRS (tip-ring-sleeve) jack or connector to connects game console 102 to an external speaker, headphones, or a headset combining a microphone and two or more speakers (e.g., headset 105). In other examples, game console 102 may be configured with audio phono jacks or connectors (e.g., RCA connectors, multiple TRS connectors) to connect game console 102 to a compatible audio receiver or television that can output the game audio.

With respect to digital audio, game console 102 may utilize standard or customized analog or digital audio interfaces. For example, game console 102 may utilize digital audio interconnects, such as S/PDIF (Son/Philips Digital Interconnect Format) over a RCA coaxial cable or over a TOSLINK fiber optic cable, to output game audio to a television or an audio receiver. Game console 102 may also utilize computer digital communication standards, such as Universal Serial Bus (USB), to carry and output the digital audio to an intended audio recipient (e.g., television, audio receiver, speaker system, etc.).

The digital audio described herein may be encoded in one (or more) of a variety of digital audio formats (i.e., digital audio encodings) that compresses one or more discrete audio channels into one or more digital data streams that are carried to an audio device (e.g., receiver) for eventual decoding and output. Example digital audio encoding schemas include those developed by Dolby Laboratories, Inc., such as Dolby Digital® (also referred to as Dolby 5.1 or AC-3) Dolby Digital® EX, Dolby Digital® Plus, and Dolby Digital® Live, and those developed by DTS, Inc., such as DTS Connect. Additionally, before outputting the game audio, some game consoles may up-convert (i.e., transform) game audio containing a low number of audio channels into game audio containing a higher number of audio channels. For example, technology such as Dolby® Pro Logic II from Dolby Laboratories, Inc., could be used by game console 102 to transform game audio containing stereo sound (i.e., containing two audio channels) into game audio containing 3 or more channel sound (e.g., stereo sound to 5.1 channel surround sound).

Further, with respect to audio, the illustrated environment contains a headset 105, comprising a microphone and speaker, connected to game console 102. Though the illustrated headset comprises only one speaker, it should be understood that other headsets could also be utilized with game console 102, including headsets equipped with multiple speakers, and headsets with or without a microphone. Typically, the microphone of the headset is utilized by a gamer to chat with other gamers before, during, or after game play, and may be utilized as another form of input during game play (in addition to a game controller). For example, while playing a first-person shooter game, the microphone may be utilized by a first gamer to verbally converse and coordinate with other real-life gamers playing in the same first-person shooter game over a network (e.g., the Internet). In another example, a gamer may chat with their gamer "friends" online, over the Internet, outside of a game session. In yet another example, the microphone may be used for submitting voice commands to game console 102, or for submitting game inputs to a video game (e.g., lyrical input for a music-based game).

Depending on the type of game console or headset, headset 105 may be connected to game console 102 directly or indirectly using a wired or wireless interface. Direct connection can be made via analog connection (e.g., using one 3.5 mm audio jack to connect the headset microphone to the game console, and one 3.5 mm audio jack to connect the headset speaker(s) to the game console) or via digital connection (e.g., via a USB connection, which carriers game audio from the game console to the headset speaker(s) and chat audio from the headset to the game console). In other embodiments, headset 105 may be indirectly connected to game console 102, such as via a game controller 104 that, in turn, is connected to game console 102 through a wired or wireless connection. The headset 105 may connect to game controller 104 via an analog connection or a digital wired or wireless connection.

Continuing with the example environment, gaming controllers 104 can be used to allow gamers to provide input to the game software as well as to receive feedback from the game software during set up and game play. As described in the background section, controllers 104 can include, for example, X, Y, A, B buttons, trigger buttons, analog joysticks, key pads, and other devices to allow the user to provide input to the game. Thus by actuating the various buttons, switches or joysticks, the gamer can control the operation of the game or control characters or vehicles in the game. The interface between controllers 104 and gaming console 102 might be either wired and/or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live™, or other entities or services. Also, through a communication network 108, gamers might compete amongst other gamers at their gaming systems 100, even if such other gamers at remote or distant locations. Note that depending on the gaming environment, remote gaming systems 100 might or might not have similar configurations to one another.

From time-to-time, the present technology is described herein in terms of this example environment. Description in terms of this example environment is provided to allow the various features and embodiments of the technology described herein to be portrayed in the context of an exemplary application. After reading this description, it will become apparent to one of ordinary skill in the art how the technology described herein can be implemented in different and alternative environments.

The present technology is directed toward systems, methods and apparatuses for audio headsets configured with sound processing. Particularly, one or more embodiments are directed toward audio headsets comprising a signal processor configured to process source audio received from an audio source, produce processed audio from the source audio, and output the processed audio to the speakers of the headset. In some embodiments, the signal processor is programmable, and the headset further comprises a control unit configured to control operation of the signal processor according to an audio profile, wherein the audio profile causes the signal processor to selectively mix, delay, phase shift, and equalize the source audio, thereby producing processed audio.

For example, the audio profile may cause the signal processor to enhance (i.e., process) the source audio to output 3-dimensional (3D) sound through the headset's one or more speakers, or where audio source is a video game console or gaming computer, to enhance the source audio in accordance with the video game currently being played. An audio profile, for instance, may cause the signal processor to emphasize, isolate, or suppress certain sounds output from a video game, thereby enhancing the gamer's experience of the game and assisting the gamer during game play (e.g., cue the gamer to respond within the game, or determine the response type). For example, in the case of a first-person shooter game, an audio profile may be configured to cause the signal processor to emphasize or isolate certain sounds to enhance game play. Particularly, an audio profile may be configured to cause the processor to enhance sounds to improve the gamer's perception of gaming cues such as sounds of footsteps, approaching vehicles, weapons fire, and doors opening. Likewise, audio profiles can be configured to suppress unwanted sounds such as background noise or other sounds, such as sounds that may mask other sounds the gamer wishes to hear. Furthermore, profiles can be configured to cause the processor to perform the dual role of emphasizing desired sounds while suppressing undesired sounds.

Depending on the embodiment, an audio profile may be associated and configured for use with a particular video game genre (e.g., simulators, fighting games, first-person shooting games, role-playing games, etc.) or a specific video game title (e.g., Call of Duty® by Activision). For example, profiles can be configured for game genres to enhance (or suppress) certain sound types as desired. As another example, audio profiles for specific video game titles may be utilized where game audio for specific actions or activities (e.g., footsteps from characters walking, weapons fire from a variety of weapons) vary from video game title to video game title.

Figure 2:
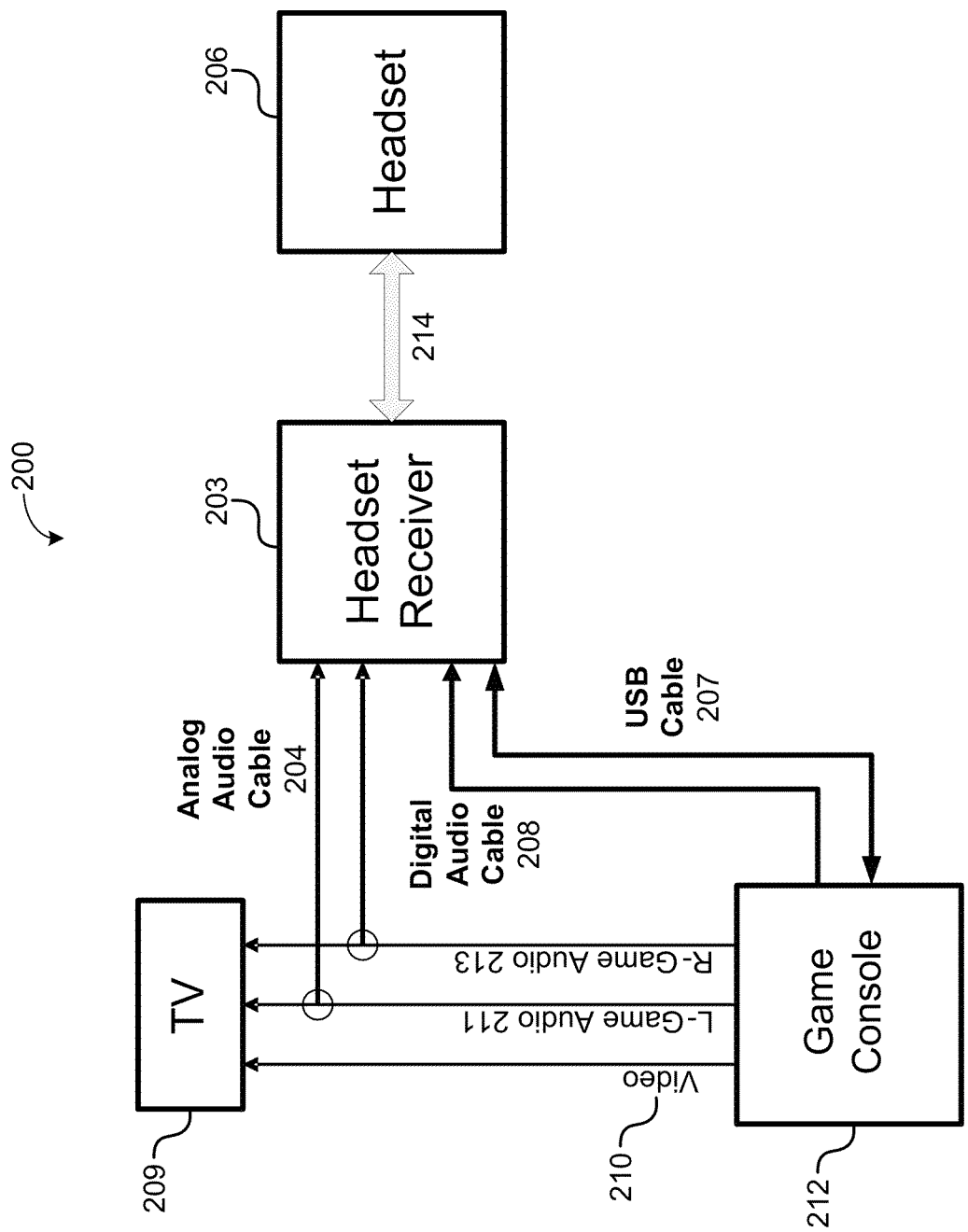
FIG. 2 is a block diagram illustrating an example audio headset system in accordance with some embodiments of the technology disclosed herein.

FIG. 2 is a block diagram illustrating an example audio headset system 200 in accordance with one embodiment of the technology described herein. Game console 212 is connected to and provides television 209 with a video signal 210, a left (211) analog audio channel, and a right (213) analog audio channel. The audio/video signal can be provided via a number of different connections and signals such as, for example, HDMI, DVI, Component Video and audio, RCA, DisplayPort, just to name a few.

In the illustrated example, the audio headset system includes two main modules, a headset receiver 203 and an audio headset 206, interfaced with game console 212 (or other audio source). In some embodiments, headset receiver 203 is physically integrated with headset 206. For example, components of headset receiver 203 can be packaged into either or both of the left and right earpieces of headset 206. In some embodiments, the receiver module may be separately packaged from the headset. Such a configuration may be utilized to: (a) displace some or all of the components and interfaces of the system to a unit/module separate from the headset (e.g., headset receiver 203). In some embodiments, this can be implemented in such a manner to make the headset lighter, less bulky or more comfortable for a headset user. In embodiments where headset receiver 203 is separately packaged, headset receiver 203 can be connected to headset 206 via wired or wireless connection. Likewise, headset receiver 203 can be connected to game console 212 via a wired or wireless interface. In some embodiments, separating the headset receiver 203 from headset 206 can enable wireless headset operations in situations where the audio source lacks support for such a connection.

With respect to internal components, audio headset system 200 may comprise: a first signal processor in headset 206 configured to process source audio pre-processed by headset receiver 203, to produce processed audio from the pre-processed source audio provided by headset receiver 203, and to output the processed audio to the speaker of headset 206; and a second signal processor configured to receive digital audio from game console 212, to decode the digital audio to analog audio, and to output the analog audio to the first signal processor as pre-processed source audio. With such a configuration, headset receiver 203 of the embodiment can decode (i.e., pre-process) source audio that is in a known audio encoding format from an audio source (i.e., game console 212), before the source audio is enhanced by headset 206 for output to its speakers. For example, headset receiver 203 could decode source audio that is in a known audio encoding format, such as Dolby Digital®, Dolby Digital® EX, Dolby Digital® Plus, and Dolby Digital® Live, before the encoded source audio reaches headset 206 for further processing (i.e., based on an audio profile selected on headset 206).

As illustrated, headset receiver 203 can be configured to accept multiple inputs from game console 212, including, for example, analog audio cable 204, digital audio cable 208, and USB cable 207, any of which can carry and provide game audio from game console 212 to headset receiver 203. For example, analog audio cable 204 may be a RCA cable or other analog connection, which carries an analog left audio channel (211) and analog right audio channel (213) channels to headset receiver 203 from game console 212. As a further example, digital audio cable 208 may be an optical or a coaxial cable that carries a digital audio signal from game console 212 to headset receiver 203. Depending on the embodiment, the digital signal coming from game console 212 to headset receiver 203 may be encoded in Dolby Digital® 5.1 when Dolby output is enabled, or encoded in PCM digital stereo when Dolby output is not enabled. USB cable 207 may carry a digital audio signal to and from game console 212 and headset receiver 203 (e.g., game audio and chat audio from game console 212 to headset receiver 203, or microphone audio (i.e., chat audio) from microphone on headset 206 to game console 212). In some embodiments, USB cable 207 may also provide power to headset receiver 203 and, possibly, to headset 206 (by way of headset receiver 203), thereby alleviating the need for one or more individual power supplies to power the headset receiver 203 and headset 206 (e.g., battery, or a plug-in power adapter). In other embodiments, power could be provided to either headset receiver 203, headset 206, or both using other types data and non-data connections that are capable of carrying power to the components (e.g., IEEE1394, also known as Firewire).

Figure 3:
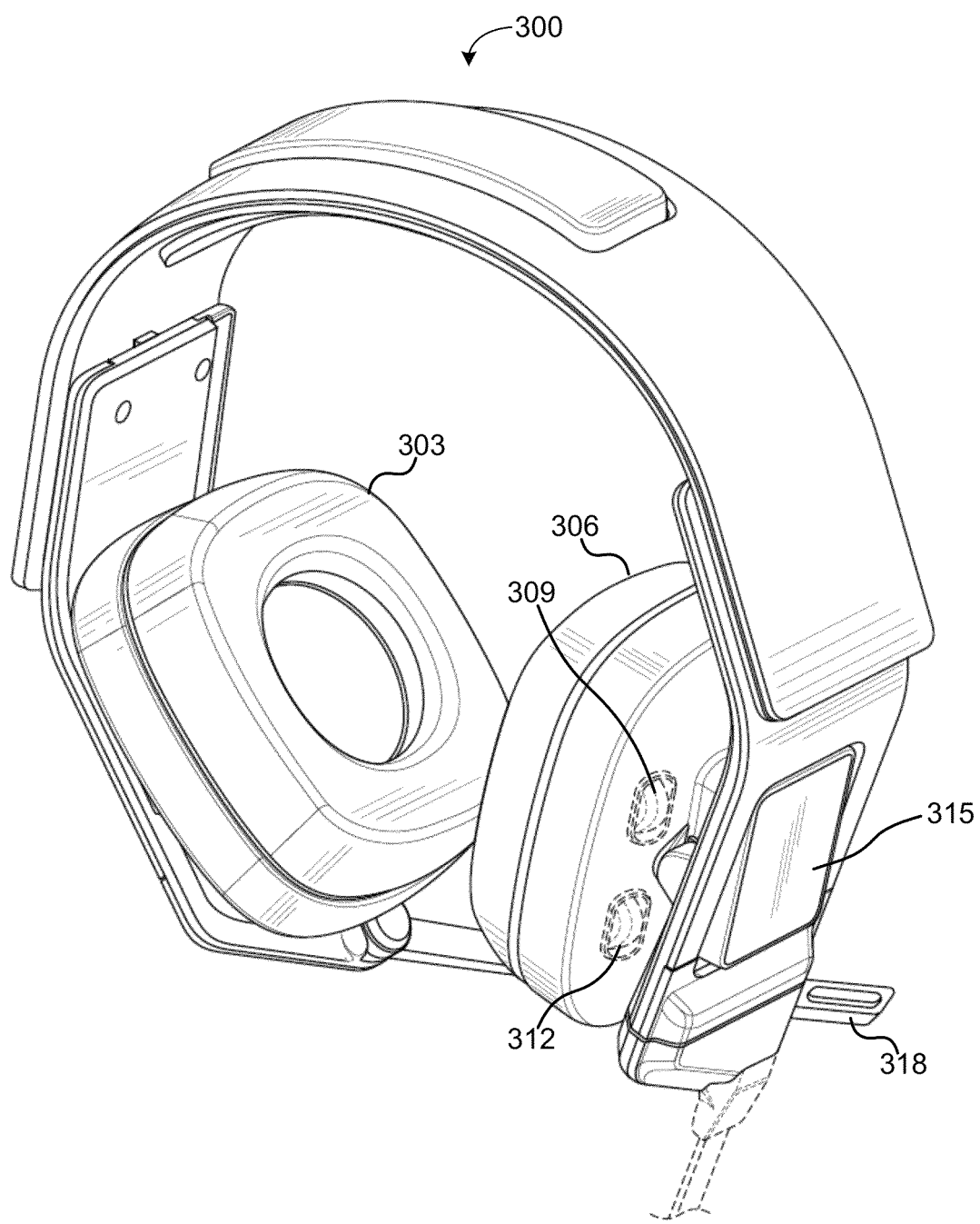
FIG. 3 depicts an example audio headset with which some embodiments of the technology disclosed herein can be implemented.

FIG. 3 depicts an example audio headset 300 with which some embodiments of the technology described herein can be implemented. Headset 300 comprises left and right earmuffs 303 and 306, input mechanisms 309 and 312, embedded LCD screen 315 and microphone 318. Left and right earmuffs 303 and 306 provide audio to a person wearing audio headset 300 (i.e., user). As further discussed with respect to FIG. 5, headset 300 may be coupled to an audio headset receiver configured to receive one or more audio inputs from different audio sources (e.g., game console or home audio system), where each of the audio inputs may be in a different audio format (e.g., analog or digital). The input mechanisms 309 and 312 may enable a user to control the operation or settings of headset 300 or an audio headset receiver coupled to headset 300. A user wearing audio headset 300 may use microphone 318 to speak to others, to vocalize commands to systems, or to make recordings.

Depending on the embodiment, LCD screen 315 may display information regarding headset 300 or various other components coupled to headset 300 (e.g., headset 300's settings or currently selected audio profile), may display audio or user profiles available for user selection, and may display graphical representation (e.g., image or animated clip) of a audio or user profile (e.g., an avatar for a user profile). LCD screen 315 may further display what is enabled and disabled on headset 300 (e.g., enable/disable audio processing algorithm), what is stored on the headset (e.g., audio profiles, or user profiles), or what software/firmware is installed. For certain embodiments, the LCD screen may be a touch-enabled screen through which a user can interact with headset 300. A touch-enabled screen could provide input mechanisms (e.g., graphical button or scroll bar) needed for the user to interact with headset 300. More regarding LCD screen 315 is further discussed with respect to FIG. 5.

Figure 4:
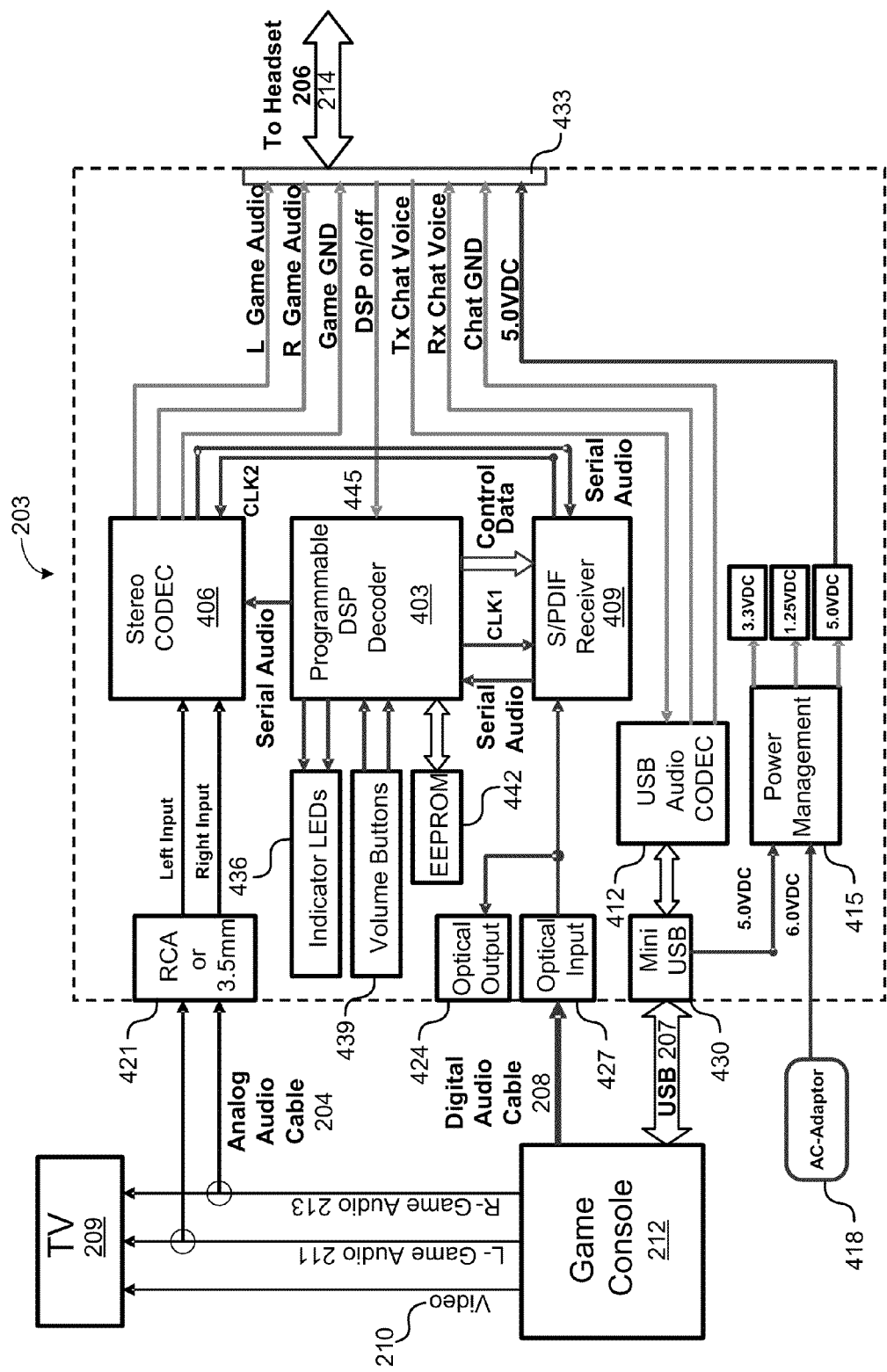
FIG. 4 is a block diagram illustrating an example audio headset receiver in accordance with some embodiments of the technology disclosed herein.

FIG. 4 provides a block diagram of an example embodiment of headset receiver 203 in accordance with embodiments of the technology described herein. Turning now to FIG. 4, headset receiver 203 in this example comprises a programmable digital signal processor (DSP) 403 and a stereo codec 406. Programmable digital signal processor 403 functions as an audio decoder of digital signals received from game console 212. Stereo codec 406 decodes (digital) serial audio data from processor 403 to (analog) stereo audio (i.e., left and right audio channels) for output to headset 206. Stereo codec 406 also encodes stereo audio from game console 212 to serial audio data so that it can be processed by processor 403 via S/PDIF receiver 409 (e.g., to apply known audio encoding formats, such as Dolby Headphone®) before being transmitted to headset 206 (i.e., through interface 433 to connection 214). In order for codec 406 to operate, S/PDIF receiver 409 provides with a clock signal (CLK2). Depending on the embodiment, S/PDIF receiver 409 may generate CLK2 by either extracting a clock signal from the digital signal being received from the game console 212 (e.g., via digital audio cable 208 connected to optical input 427) or, where headset receiver 203 is receiving an audio signal via an analog signal (e.g., via analog audio cable 204 connected to RCA input 421), receiving a clock signal from processor 403 (i.e., CLK1). Optionally, optical output 424 may configured to provide a by-pass for an audio signal provided through optical input 427, thereby allowing the audio signal to be shared with other audio devices (e.g., another optical audio receiver, such as a home audio system).

S/PDIF receiver 409 to process serial audio data from game console 212, processor 403 provides S/PDIF receiver 409 with a clock signal. In some embodiments, a clock signal is provided to processor 403 via a crystal (not shown).

Digital signal processor 403 receives its instructions from Electrically Erasable Programmable Read-Only Memory (EEPROM) 442, which stores the programming for the processor 403. Processor 403, in turn, receives the audio to be processed from S/PDIF receiver 409 as serial audio data. This serial audio data is either digital audio data received by S/PDIF receiver 409, or analog data digitally coded by stereo codec 406.

Headset receiver 203 is configured with indicator LEDs 436 that indicate the operation of processor 403, volume buttons 439 to control volume of audio being outputted by the processor 403, and a DSP on/off control line 445 that allows headset 206 (i.e., controller of headset 206) to enable or disable the processing applied by processor 403.

S/PDIF receiver 409, in turn, may receive digital audio from game console 212 via optical input 427, or from stereo codec 406 as serial audio data. S/PDIF receiver 409 as shown is controlled by digital signal processor 403. As described herein, stereo codec 406 is configured to receive stereo audio from game console 212, encode the stereo audio to serial audio data that can be processed by processor 403, and decode serial audio data, from processor 403, to (analog) stereo audio (i.e., left and right audio channels) that can be outputted to headset 206 via headset interface 433. The analog interface can be an RCA or 3.5 mm TRS interface 421 or other suitable audio interface.

USB cable 207, which interfaces with headset receiver 203 via a mini-USB interface 430, supplies power to headset receiver 203 through power management 415 and to the headset through headset interface 433. Alternatively, headset receiver 203 and the headset could be powered through power management 415 via an AC adaptor 418. Through USB audio codec 412, the system can also receive and transmit chat audio (i.e., relay voice audio) between game console 212 and headset 206 (via headset interface 433). Other digital interfaces in addition to or in place of the mini-USB interface 430 can be provided.

Figure 5:
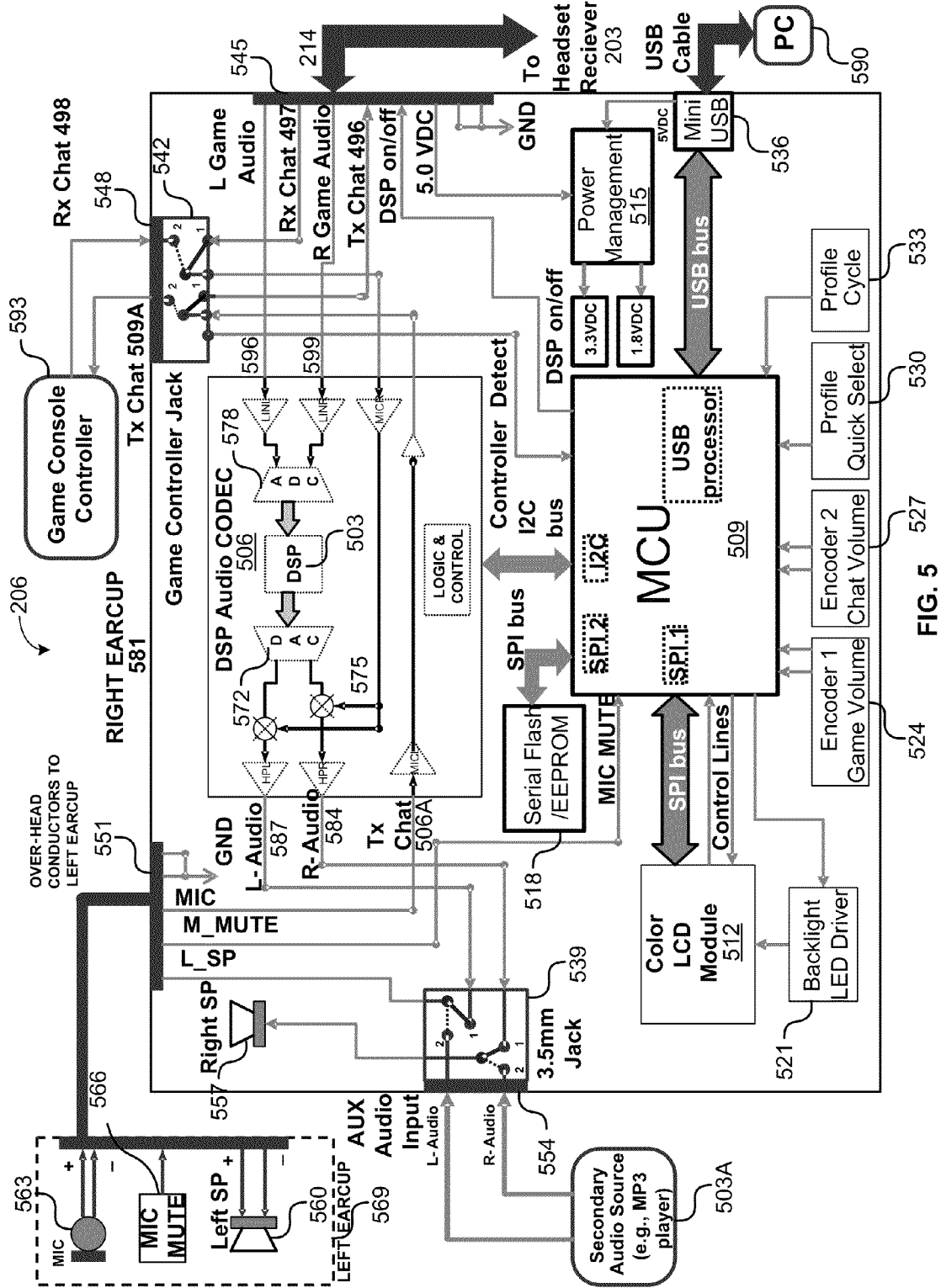
FIG. 5 is a block diagram illustrating an example component of an audio headset in accordance with some embodiments of the technology disclosed herein.

FIG. 5 is a block diagram of an example implementation of headset 206, in accordance with embodiments of the technology described herein. Turning now to FIG. 5, headset 206 comprises: a microcontroller unit (MCU) 509, which controls the overall function of headset 206; and a digital signal processor (DSP) audio codec 506, which performs audio signal processing for headset 206. As shown, MCU 509 controls DSP audio codec 506 by way of an inter-integrated circuit (I2C) bus. Through one Serial Peripheral Interface (SPI) bus, MCU 509 interfaces with a serial flash/EEPROM module 518, which stores audio profiles for DSP audio codec 506 and instructions that govern MCU 509's operation. Through another SPI bus, MCU 509 also interfaces with and controls color LCD module 512, which MCU 509 can use to display the status and operation of headset 206 and/or headset receiver 203. As described herein and illustrated in FIG. 5, MCU 509 controls the enablement and disablement of headset receiver 203's digital signal processor (i.e., 403) via headset receiver interface 545. In other embodiments, MCU 509 may control more aspects of headset receiver 203 than just enablement or disablement of its digital signal processor (e.g., selection of audio source). In some embodiments, MCU 509 is provided a clock signal via a crystal.

In some embodiments, when headset 206 is connected to a computing device, such as a PC 590, MCU 509 can receive software (e.g., firmware), settings, instructions user profiles or audio profiles from computing device to headset 206 through mini-USB interface 536, and, subsequently, store such software, settings, instructions, user profiles, or audio profiles on serial flash/EEPROM module 518. Conversely, MCU 509 may retrieve instructions and audio profiles from serial flash/EEPROM module 518 and transmit them to the computing device through mini-USB interface 536. Depending on the embodiment, transmitting data to and receiving data from headset 206 (e.g., software, instructions, audio profiles) may be facilitated by a software operating on the computing device coupled to headset 206. More with regard to such software is discussed with respect to FIG. 6.

Mini-USB interface 536 can also supply power to MCU 509 via power management 515, which, in turn, can receive power by way of mini-USB interface 536 or headset receiver interface 545, thereby obviating the need for a separate and possibly cumbersome power supply for headset 206. Mini-USB interface 536 also allow headset 206 to be powered when not connected to headset receiver 203. For example, when uploading audio profiles to headset 206, downloading audio profiles from headset 206, or updating firmware on headset 206, headset 206 may be required to connect to a computer that is not in close proximity to the game console and headset receiver 203. Because connecting headset 206 may require the user to disconnect headset 206 from headset receiver 203 in order to move headset 206 closer to the computer for connection purposes, headset 206 can be powered by the connection with the computer as to facilitate data transfer the computer and headset 206.

In some embodiments, a user may control the functions of headset 206 using a set of input mechanisms, such as knobs, switches, and buttons, which interface with MCU 509. Depending on the embodiment, the set of input mechanisms may be embedded into the housing of headset 206 or, alternatively, into an external component (e.g., headset receiver 203, or a control box on the wire connecting headset 206 to headset receiver 203). In the illustrated embodiment, encoder 1 game volume 524 can control the volume of the game audio that is being output to the speakers. Encoder 2 chat volume 527 can control the volume of chat audio being output to the speakers.

Profile cycle 530 may be a button (or some other input mechanism) that allows a user to cycle through different audio profiles that can be applied to game audio received, chat audio received, or microphone audio (i.e., chat audio) sent. Profile cycle 530 may cycle through audio profiles loaded on headset 206 or those residing in another components coupled to the headset 206 (e.g., headset receiver). The order in which the audio profiles are cycled may be based on user configuration (e.g., configuration of the headset 206 based on software).

Profile quick select 533 may be included and can be implemented as a button, switch or some other input mechanism that allows the user to switch quickly between different audio profiles. In some embodiments, the different audio profiles selected by profile quick select 533 may be one or more audio profiles designated (e.g., by user configuration) for quick selection. In certain embodiments, profile quick select 533 may be configured to toggle between two modes, where in a first mode a single, "quick select" designated audio profile is applied to headset 206, and in a second mode an audio profile selected by profile cycle 530 is applied to headset 206. In this manner, a user can quickly switch to the "quick select" designated audio profile without having to cycle through two or more audio profiles using profile cycle 530.

For some embodiments, the audio profile selected by profile cycle 530 or profile quick select 533 may be applied to the game audio received, chat audio received, or microphone audio (i.e., chat audio) sent. For example, profile cycle 530 can allow the user to select from among a plurality of audio profiles for audio processing. For example, the user may be able to select from a plurality of modes to enhance or suppress certain sounds during game play. For example, as described above, the user may select profile to enhance the sounds of approaching footsteps and suppress background noise. In some embodiments, profile selection (in addition to other information) can be displayed on color LCD module 512 to allow the user to see which audio profile or user profile is selected (e.g., using profile cycle 530). In further embodiments, profile information can be provided to the gaming console such that the selected audio profile or the selected user profile can be displayed by the game console on the game screen. In some embodiments, the user may be provided with a menu of audio or user profile choices through color LCD module 512, or through the game screen, in order to facilitate profile selection The audio profiles can be preloaded into the audio headset such as, for example, in serial flash EEPROM 518. In addition, audio profiles can be externally generated and loaded onto the headset via interface such as, for example, a mini-USB interface 536. For example, profiles may be included with the game and downloaded via a wired or wireless connection of the headset to the gaming console or through a download via controller. For example, the gaming console may be configured to allow the user to access profiles included with the gaming console, profiles included with the game software, or profiles available online through the gaming console. As another example, profiles can be downloaded from the Internet or other external source, either through a connection of the headset to a computer or other web portal, through a connection of the headset to the gaming console (directly or through the controller) or otherwise. In yet further embodiments, the user may be given the capability to generate his or her own profiles, or to adjust existing profiles, on the gaming console, on a separate computing system or otherwise.

Microphone mute 566 may be a button or switch that instructs the MCU 509 to mute all microphone audio (thereby preventing any chat audio from being transmitted from the headset 206 to the headset receiver). Microphone mute 566 is shown to be housed in the left earcup 569 of headset 206, along with the microphone (563) and the left speaker (560) of headset 206, while the other input mechanisms (encoder 1 game volume 524, encoder 2 chat volume 527, profile cycle 530, and profile quick select 533) are housed in the right earcup 581, along with the right speaker 557 and other major components. Right earcup 581 interfaces with the left earcup 569, and its various components, via conductors 551 (e.g., wires) disposed over the user's head (e.g., in a frame or a conduit that makes up the headset) when they are wearing headset 206.

As noted herein, color LCD module 512 may be utilized to display and otherwise facilitate selection of an audio or user profile used by the audio headset. In addition to displaying audio or user profile information, color LCD module 512 may graphically display operational parameters of the audio headset (e.g., chat volume, audio volume, microphone on, or microphone off), audio processing settings (e.g., audio processing enabled or disabled), or audio source selection (e.g., optical input or analog input). Color LCD module 512 may also display a graphical representation (e.g., one or more images) of an audio profile or a user profile, possibly once a user has selected such a profile or when a user is browsing through profiles to select. For instance, the color LCD module 512 may display a game character, such as solider or dragon, from a game title, where the game character represents the user profile currently selected, or an audio profile associated with the game title. In some embodiments, what is shown may be dynamically generated based on the attributes of the audio or user profile, or may be specifically defined by a user (e.g., user defines an association between a graphical representation and an audio profile or a user profile). Depending on the embodiment, the graphical representation used may be an animated image (e.g., animated GIF) or a short movie clip.

For certain embodiments, the graphical representation may be shown via color LCD module 512 according to a predetermined time period. For example, when a user ceases to utilize input mechanisms of MCU 509 (i.e., user inactivity with respect to the input mechanisms) for a given period of time, color LCD module 512 may be disabled, possibly to conserve power, increase the lifespan of color LCD module 512, or avoid the nuisance of backlighting of color LCD module 512. When the user resumes use of the input mechanisms (i.e., resumes on user activity through the input mechanisms), the time period may be reset and color LCD module 512 re-enabled. More regarding information possibly shown through the color LCD module 512 is further discussed with respect to FIG. 7.

Backlight LED driver 521 provides the backlighting for color LCD module 512, thereby rendering information displayed through color LCD module 512 visible. Backlight LED driver 521 may be configured to turn on and off based on whether color LCD module 512 is displaying information, or based on whether there is any user activity with respect to the input mechanisms of MCU 509. Backlight LED driver 521 may be further configured to adjust the backlight based on the lighting of the ambient environment or a user preference.

In order to process audio received by headset 206, DSP audio codec 506 comprises: logical & control component through which MCU 509 controls the operation of audio codec 506; a digital signal processor (DSP) 503; an analog-to-digital converter (ADC) 578 to convert the left and right analog signals of game audio (596, 503A) received from headset receiver 203 to a digital signal that can be processed by DSP 503; an digital-to-analog converter (DAC) 572 to convert the digital signal outputted by DSP 503 to a left and right analog signals that can be played by left speaker 560 and right speaker 557; and a number of signal drivers for various inputs and outputs to audio codec 506 (line-in left [LINL], line-in right [LINR], headphone left [HPL], headphone right [HPR], microphone right [MICR] for chat audio received from the headset receiver, and microphone left [MICL] for microphone audio (i.e., chat audio) received from microphone 563—Tx Chat 506A). As shown, DSP audio codec 506 mixes (575) the chat audio received (via MICR), from either headset receiver 203 (Rx Chat 497) or game console controller 593 (Rx Chat 498), into the processed game audio (left 587 and right 584 analog audio signals) outputted to headset 206's speakers (560, 557).

In some embodiments, DSP audio codec 506 also receives microphone audio (i.e., chat audio) from microphone 563 and that audio is eventually routed based on what type of game console or game controller that headset 206 or headset receiver 203 is connected. MCU 509 can facilitate the detection of the connection and the game console or game controller type, and route the audio accordingly. However, here game controller jack 548 facilitates the routing of the audio from microphone 563. As shown in FIG. 5, when headset 206 is connected to a game console controller 593 through game controller jack 548, the chat audio received from microphone 563 (Tx Chat 506A) is routed (542) to the game console controller 593 (Tx Chat 509A); when headset 206 is not connected to a game console controller 593 through game controller jack 548, the chat audio received from microphone 563 (Tx Chat 506A) is routed (542) directly to the game console controller 593 (Tx Chat 496). Likewise, game controller jack 548 is responsible for routing (542) chat audio received from the game console controller 593 (Rx Chat 498) to audio codec 506 when game console controller 593 is connected to game controller jack 548, and routing chat audio from headset receiver 203 (Rx Chat 497) to audio codec 506 when game console controller 593 is not connected to game controller jack 548.

As described herein, DSP audio codec 506 eventually mixes (575) the chat audio received (whether from the headset [Rx Chat 497] or from game console controller 593 [Rx Chat 408]) with the processed game audio being outputted (587, 584) to the speakers (560, 557) (i.e., mixing received chat audio with the processed game audio produced by DSP 503).

Game controller jack 548 may be a standard or proprietary interface that connects with the game console controller, either through a wired or wireless connection. For example, game console controller 593 may be a Microsoft® XBOX 360® controller having a wire interface for connecting a speaker and microphone headset to the controller. Once headset 206 is plugged-in, MCU 509 will route microphone audio (i.e., chat audio) to game controller jack 548 to the game controller and route chat audio from the game controller through game controller jack 548 to the speakers. As a result, a headset user can chat with other gamers using headset 206, where the chat audio is relayed to and from the game console through game console controller 593.

Headset 206 may also equipped with an auxiliary audio input that allows for a headset user to output audio from a second audio source, such an MP3 player. Here, headset 206 comprises an auxiliary (AUX) audio input jack 554 (e.g., 3.5 mm jack), which enables a secondary audio source 599 to connect to headset 206 and output its audio into the left and right speakers. As illustrated, when secondary audio source 599 is connected to headset 206 via auxiliary audio input 554, input 554 exclusively routes (539) the audio from secondary audio source 599 to the speakers in place of the processed game audio (left 587 and right 584 analog audio signals) being outputted from DSP audio codec 506. In other embodiments, headset 206 could be configured to augment (i.e., mix) the processed game audio outputted by DSP audio codec 506. For example, similar to received chat audio, headset 206 could be configured to use DSP audio codec 506 to mix in audio from secondary audio source 599 with processed game audio generated by DSP 503.

It should be noted that although FIG. 5 illustrates the main components of the embodiment being housed in the right earcup 581 of headset 206, in other embodiments some or all of the main components shown could be housed in the left earcup or, alternatively, displaced to headset receiver 203 or another external component.

As described herein, depending on the embodiment, DSP 503 of headset 206 could be configured to: process game audio received by headset 206 (e.g., received directly from a game console or, as illustrated, received from the headset receiver), process microphone audio (i.e., chat audio) received from microphone 563; or process chat audio received by headset 206 received directly from a game console, from game console controller 593, or from the headset receiver. For example, in FIG. 5, headset 206 is configured to use DSP audio codec 506 to: process game audio received from headset receiver 203 (via headset interface 545 and connection 214), mix (575) chat audio received from either headset 206 or game console controller 593 into processed game audio, and route microphone audio (i.e., chat audio) received from microphone 563 based on whether a game console controller 593 is connected to headset 206; as shown, only the game audio is processed by audio codec 506 using DSP 503. As also described herein, DSP 503 may be configured to process audio its receives from ADC 578 in accordance with an audio profile, which may be stored on serial flash/EEPROM 518, that instructs MCU 509 on how to control and operate DSP audio codec 506.

Figure 6:
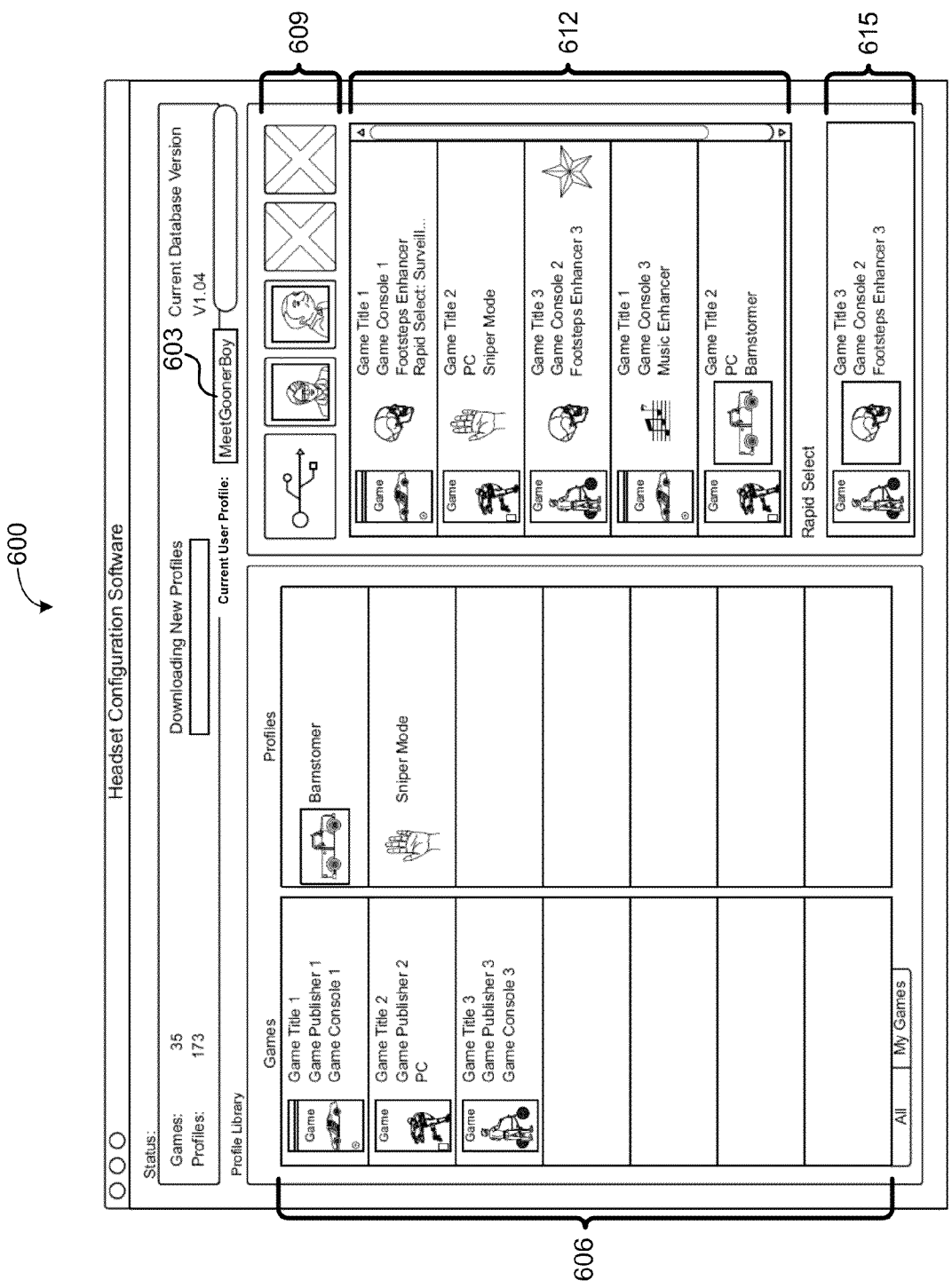
FIG. 6 depicts an example software graphical user interface that can be utilized with some embodiments of the technology disclosed herein.

FIG. 6 depicts an example software graphical user interface 600 that can be utilized with some embodiments of the technology described herein. Software graphical user interface 600 comprises a display 603 of a currently selected user profile, a listing 606 of an audio profile library, a listing 609 of user profile images, a listing 612 of uploaded audio profiles, and a display 615 of a "rapid select" audio profile. Software graphical user interface 600 may be part of a program configured to perform operations on the audio headset. For instance, the program may be utilized on a computer system to adjust settings of an audio headset when the audio headset is coupled to the computer system.

Through software graphical user interface 600, a user may access audio or user profile information or setting information relating to an audio headset. The information may be accessible while the audio headset is coupled to a computer running software graphical user interface 600, and may be further accessible when the audio headset is decoupled from the computer running (thereby allowing a user to pre-configure or reconfigure the audio headset even when the audio headset is decoupled from the computer).

In some embodiments, software graphic user interface 600 may enable a user to upload or download audio or user profiles to and from the audio headset. As noted herein, the profiles may include audio profiles associated with a particular game type or a particular game title, and may include user profiles associated with a particular user. For various embodiments, a user may associate one or more of the following with their user profile: audio profiles relating to general game types or specific-game titles, graphical representations of their user profile (e.g., image or animated clip), or adjustments to the audio headset (e.g., volume, treble, bass, audio processing settings). The user profile may further comprise one or more user-defined settings of an LCD embedded in the audio headset.

As shown in FIG. 6, software graphical user interface 600 lists the current user profile being viewed in display 603. Changes implemented through software graphical user interface 600 may only affect an audio headset when the current profile listed in display 603 is selected for use by the audio headset, or may affect the audio headset regardless of the user profile selected for use by the audio headset. When another user profile is selected through software graphical user interface 600 for viewing or adjustment purposes, display 603 may be updated accordingly.

Listing 606 displays a library of audio profiles from which a user can select and add audio profiles to the audio headset. As noted before, audio profiles selected and added to the audio headset may affect all the user profiles equally (i.e., may be available for use by the audio headset regardless of the user profile selected for use by the audio headset), or may affect only the user profile currently listed in display 603 (i.e., only available for use by the audio headset when the user profile listed in display 603 is selected for use by the audio headset). As shown, the audio profiles available in listing 606 may be organized according game titles, where each game title may have one or more audio profiles associated with the game title. For example, when "Game Title 1" is selected, the user may select from a "barnstormer" audio profile or a "sniper mode" audio profile to upload to the audio headset.

Listing 609 enumerates user profile images that are associated with various user profiles stored on the audio headset. By clicking on user profile images provided listing 609, a user may switch between user profiles they wish to view or adjust through software graphical user interface 600. In some embodiments, a user may adjust or set an association between a user profile and a graphical representation (e.g., image or animated clip) of that user profile. Subsequently, once a user profile has been stored to the audio headset, when a user profile is selected on the audio headset, the graphical representation associated with that user profile may be displayed on an LCD embedded in the audio headset.

Listing 612 provides the audio profiles currently associated with the user profile listed in display 603. The audio profiles provided in listing 602 may be those profiles that have already uploaded and stored on the audio headset. A user may cycle through and select one or more of the audio profiles enumerated in listing 602 by using a profile cycle input mechanism (e.g., profile cycle 530 of FIG. 5). The user may cycle through the audio profiles in the order in which they are provided in listing 612. In some embodiments, order in which the audio profiles are "cycled" during user selection may be adjusted by changing the order in which the audio profiles appear in listing 612.

Display 615 provides an audio profile currently designated as a "rapid select" (i.e., quick select audio profile) for the user profile listed in display 603. As noted herein, the audio profile listed in display 615 may be quickly selected by a user through a "rapid select" in put mechanism that toggles between two modes: one mode where the "rapid select" audio profile designated in display 615 is applied to the audio headset; and another mode where one or more audio profiles selected by the profile cycle input mechanism are applied to the audio headset. In doing so, a user can quickly switch to the "rapid select" designated audio profile without having to cycle through two or more audio profiles using the profile cycle input mechanism.

Figure 7:
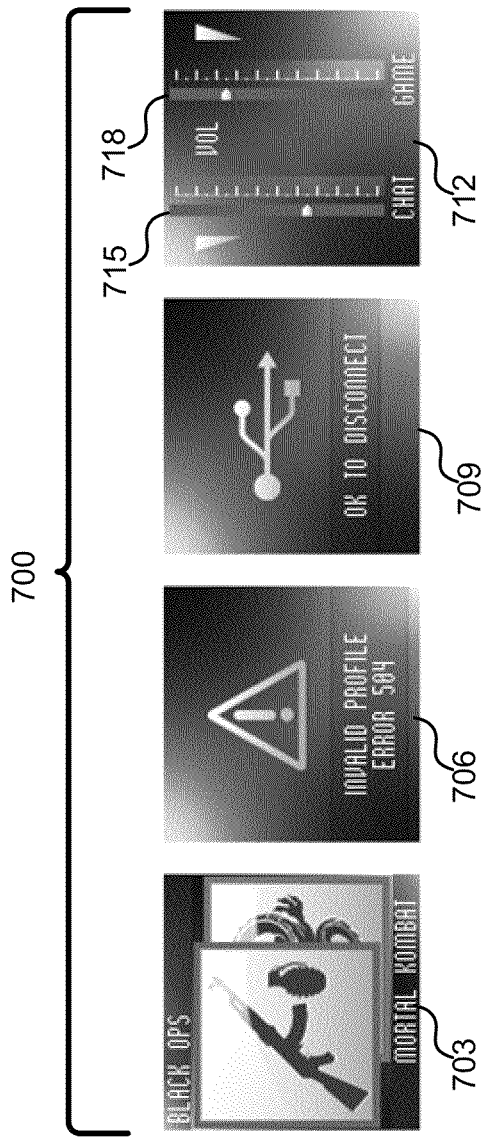
FIG. 7 depicts example graphical output by a display embedded in an audio headset in accordance with some embodiments of the technology disclosed herein.

FIG. 7 depicts example graphical output by a display embedded in an audio headset in accordance with some embodiments of the technology described herein. As noted herein, in some embodiments, the audio headset comprises a liquid crystal display (LCD) embedded (e.g., embedded into the side of an ear muff of the audio headset), which may display different information based on user interaction with the audio headset.

For example, when a user is cycling through audio profiles to apply to the audio headset, the display may present graphics and text, such as those shown in display image 703, to represent two or more the audio profiles from a user may cycle and select (e.g., using profile cycle 530). When an invalid action or an error is encountered by the audio headset, the display may present an error message similar to that shown in display image 706.

The display may present display image 709 to indicate when the audio headset is safe for disconnection from a computer that is being used to configure or adjust the audio headset (e.g., computer used to upload audio or user profiles). Additionally, the display may present display image 712 to indicate visually the current settings for the chat volume (through chat-volume bar 715) and the game audio volume (through game-audio volume bar 718). In embodiments where the display is touch-enabled, the user may adjust settings of the audio headset by touching the screen to interact with graphical inputs. For example, with respect to display image 712, through a touch-enabled display, a user may adjust the chat audio or the game-audio volume of the audio headset by dragging a volume indicator up or down along chat-volume bar 715 or game-audio volume bar 718, respectively.

Though the display images 703-712 provide examples of only certain features and functionalities of an audio headset, those of skill in the art would appreciate that a display embedded in the audio headset may provide other graphical outputs in accordance with other features and functionalities of the audio headset.

Figure 8:
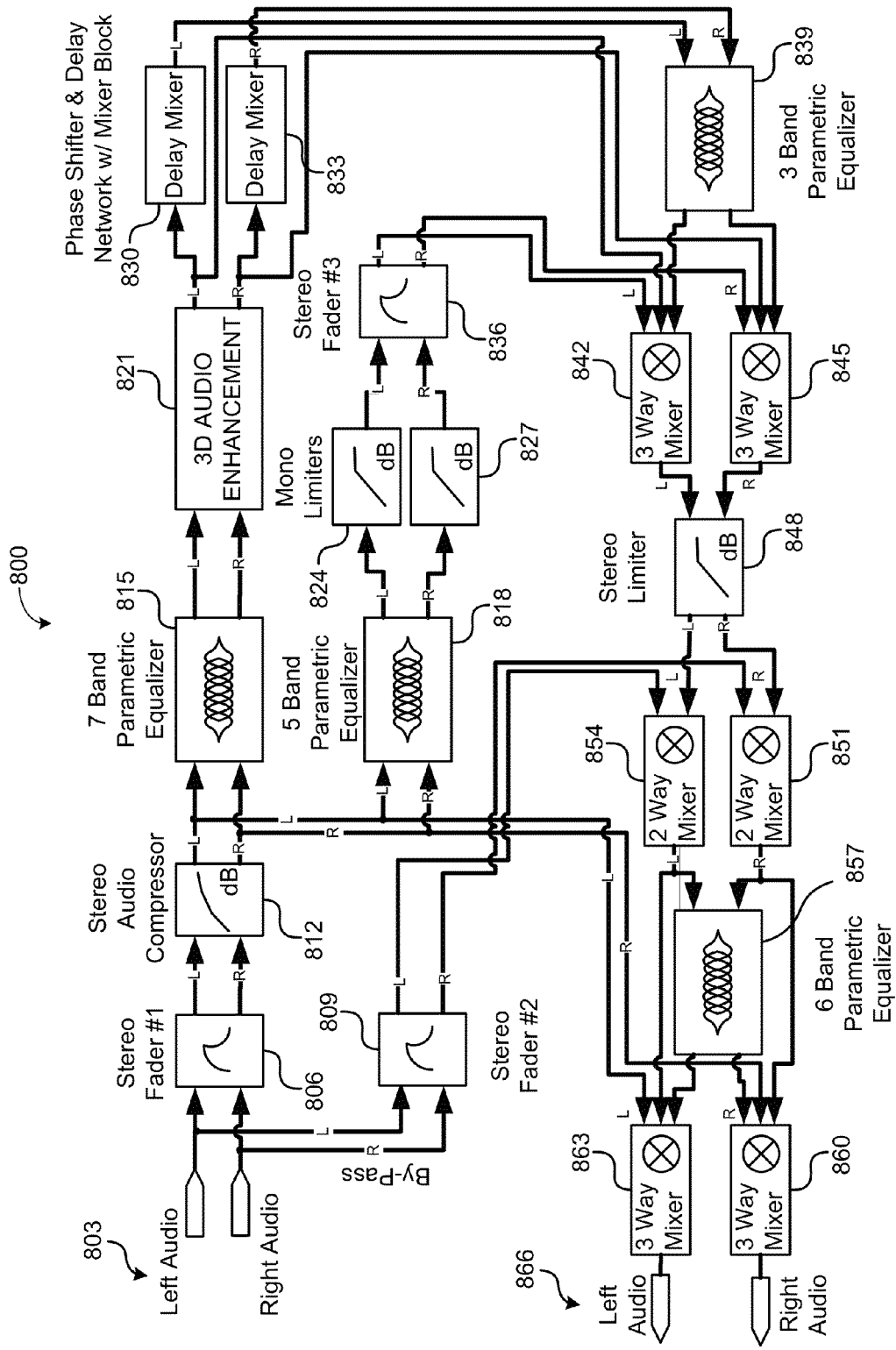
FIG. 8 is a block diagram illustrating an example signal processor algorithm in accordance with some embodiments of the technology disclosed herein.

Turning now to FIG. 8, a block diagram is provided illustrating an example signal processor algorithm 800 that can be performed by DSP 503 in accordance with an embodiment. As will be described below, FIGS. 13A-29 depict settings for signal processor algorithm 800 when an audio profile to enhance footsteps (e.g., in a first-person shooter game) has been selected. It should be noted that the settings shown in FIGS. 13A-29 could be different when alternative audio profiles are selected and implemented to signal processor algorithm 800.

Depending on the embodiment, signal processor algorithm 800 or the parameters for algorithm 800 may be stored in an audio profile. Algorithm 800 begins at 803 by receiving left and right digital audio channels (i.e., digital signals) of game audio from headset receiver 203. Where the headset receiver transmits the left and right audio signal to headset 206 in analog, an ADC (e.g., 578) may be used to convert the game audio to digital before it is received and processed by DSP 503 at 803.

Figure 9:
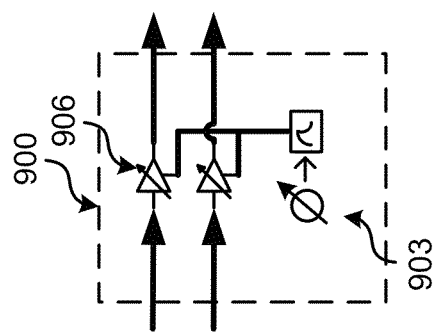
FIG. 9 is a block diagram illustrating an example stereo fader that can be used in some embodiments of the technology disclosed herein.

After receiving the left and right audio signals, algorithm 800 adjusts the fade of each of the two audio signals using stereo fader #1 (806) and stereo fader #2 (809). FIG. 9 provides a block diagram of an example stereo fader 900 that may be utilized as stereo fader #1 (806) and stereo fader #2 (809). As illustrated in FIG. 9, the stereo faders (806 & 809) could comprise adjustable amplifiers 906 that are adjusted according to controller 903. These fader blocks 806 and 809 are meant to turn the audio processing on or off. For example, depending on the selected profile, when fader #1 (806) is at 0 dB and fader #2 (809) is OFF, left and right audio 803 from is fed through the algorithm (e.g., parametric equalizers, mixers, and 3D audio enhancement). Alternatively, when fader #2 (809) is at 0 dB and fader #1 (806) is OFF, left and right audio 803 bypasses the algorithm and is routed to the output 6-bands parametric equalizer 857. By using faders as blockers, the transition from algorithm processed audio to unprocessed audio can be gradual, and allows for audio profiles where how much audio is being processed by the 3D algorithm can be controlled. For instance, an audio profile may configure algorithm 800 such that 80% of audio will be processed by three-dimensional (3D) audio enhancement component 821, while 20% from the other fader bypasses such processing. As noted herein, the settings for fader #1 (806) and fader #2 (809) depend on the audio profile that is currently selected and active.

Figure 13A:
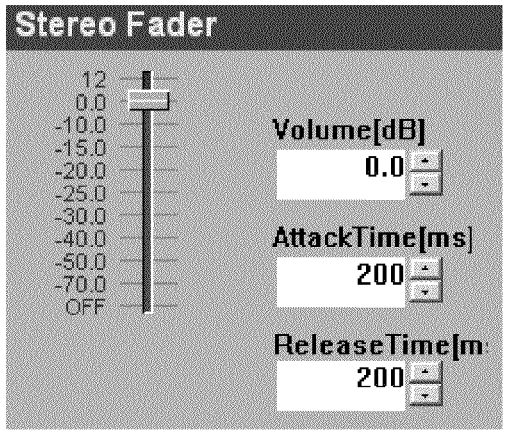
FIGS. 13A, 13B, 14, 17-19, and 21-28 are screenshots of example settings for component of a signal processor in accordance with some embodiments of the technology disclosed herein.

Example settings for stereo fader #1 (806) are illustrated in FIG. 13A, which provides a screenshot of a software tool used to adjust settings of algorithm 800. As shown, stereo fader #1 (806) is set at a threshold volume of 0 dB, an attack time of 200 ms, and a release time of 200 ms. Accordingly, stereo fader #1 (806) effectively results in.

For the remainder of this description, attack time will be understood to be the time it takes to lower the volume (i.e., lower the sound fader), and release time will be understood to be the time it takes to the volume to return to its original level (i.e., raise the sound fader to original level).

Figure 13B:
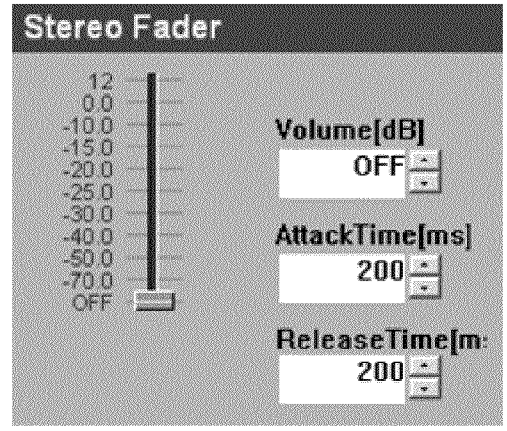

Example settings for stereo fader #2 (809) are illustrated in FIG. 13B, which also provides a screenshot of a software tool used to adjust settings of algorithm 800. As shown, stereo fader #2 (809) is set to OFF, an attack time of 200 ms, and a release time of 200 ms. Accordingly, stereo fader #2 effectively has a disabled audio output. More with respect to the output of stereo fader #2 (809) will be explained later with respect to 2-Way Mixers 854 and 851.

Figure 14:
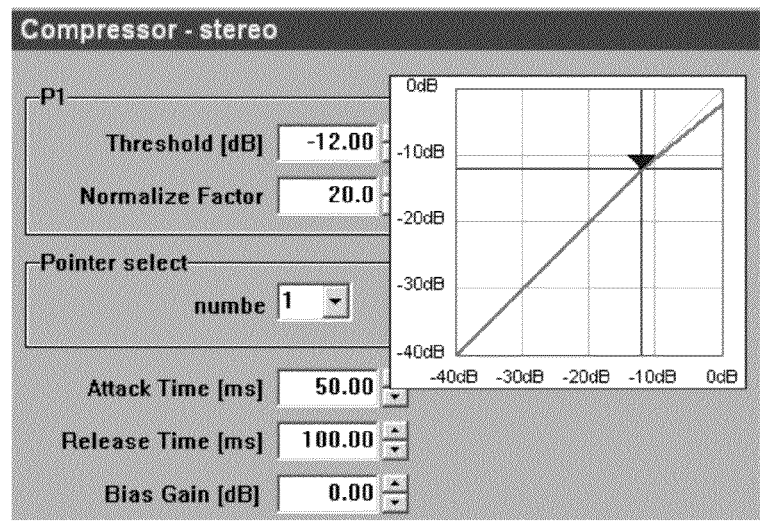

Continuing with algorithm 800, the output of stereo fader #1 (806) is processed by a stereo audio compressor 812, which compresses an audio signal once it passes a specified threshold. Depending on the selected profile, stereo audio compressor 812 may accomplish this by suppressing the highest input frequencies. FIG. 14 is a screenshot of a software tool that illustrates example settings for stereo audio compressor 812 in accordance with one embodiment of the technology described herein. As illustrated in FIG. 14, compression is set at threshold limit of −12 dB with a normalization factor of 20.0, an attack time of 50 ms, a release time of 100 ms, and a bias gain of 0 dB.

Thereafter, algorithm 800 adjusts the left and right audio channels outputted by stereo audio compressor 812 using, in parallel, a 7-band parametric equalizer 815 and a 5-band parametric equalizer 818. 7-band equalizer 815 adjusts amplitude and center frequency for seven different bandwidths of each of left and right audio channels and outputs to three-dimensional (3D) audio enhancement component 821. Depending on the selected profile, 7-band equalizer 815 may be used to filter out the lowest frequencies so we can process the higher frequencies through the algorithm. 5-band equalizer 818 adjusts amplitude and center frequency for five different bandwidths of each of left and right audio channels and outputs to 3-Way Mixers 860 and 863. More The left and right audio outputs 866 are respectively produced by 3-Way Mixers 860 and 863. More with respect to 3D audio enhancement component 821 and 3-Way Mixers 860 and 863 will be discussed later herein. Depending on the selected profile, 5-band equalizer 818 may be used to filter out low frequencies for optional bass enhancement.

Figure 15:
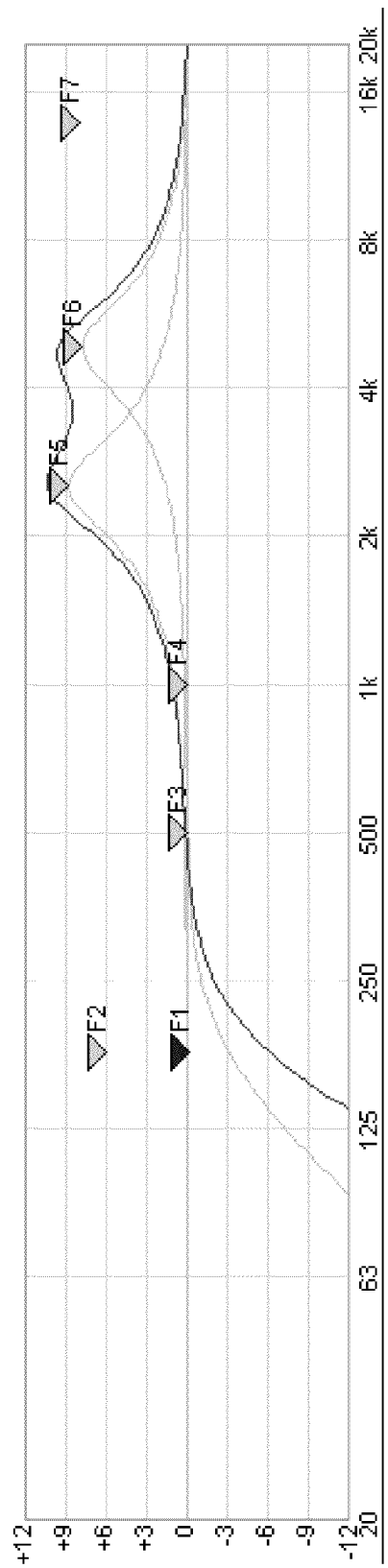
FIGS. 15, 16, 20, and 29 are charts illustrating equalizer settings for a signal processor in accordance with some embodiments of the technology disclosed herein.
Figure 16:
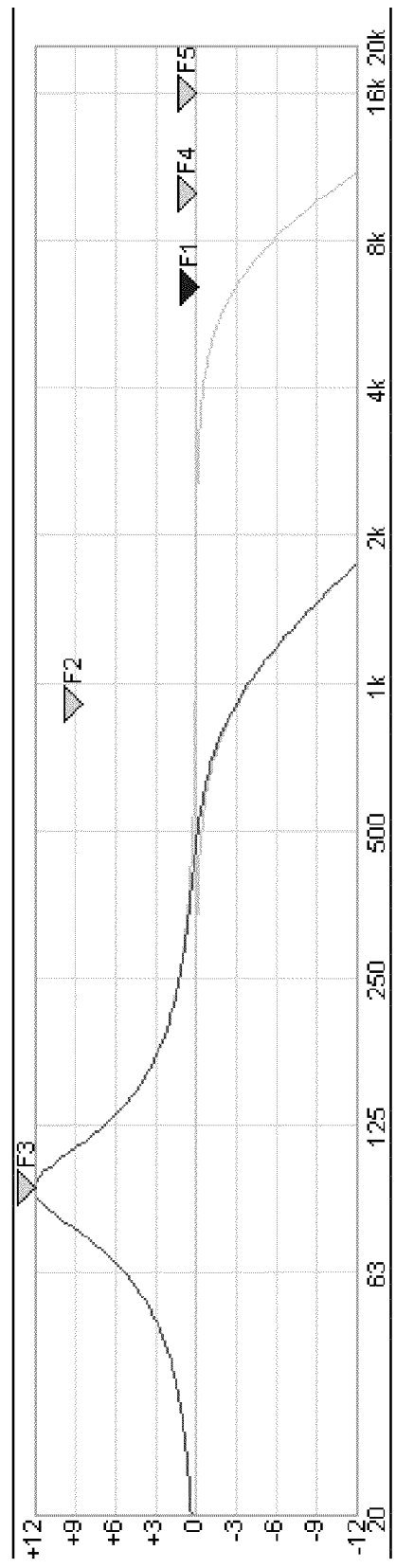

FIG. 15 is a graph illustrating example settings for band equalizer 815 for 7 bandwidths (i.e., F1-F7), and FIG. 16 is a graph illustrating example settings for band equalizer 818 for 5 bandwidths (i.e., F1-F5).

Subsequently, algorithm 800 can enhance the left and right audio channels outputted by of 7-band equalizer 815. For example, in the illustrated embodiment, the output can be processed by a three-dimensional (3D) audio enhancement component 821, which adjusts the left and right audio channels such that they provide the effect of sounds emanating from three-dimensional positions around the headset user (i.e., more than just a left and right channel). Depending on the audio profile selected, 3D audio enhancement component 821 may be used to select portions (e.g., frequencies) of the left and right audio channels, enhance those portions, and then mix those enhanced portions into both signals appropriately. In doing so, 3D audio enhancement component 821 provides an increased level of 3D sound directionality virtually using two audio channels. For example, component 821 may adjust the left and right channel so that a user will hear sounds emanating from behind them, in front of them, above them, or below them. In essence, for some embodiment, component 821 may adjust the left and right audio channels such that a user perceives more than two audio channels.

Figure 10:
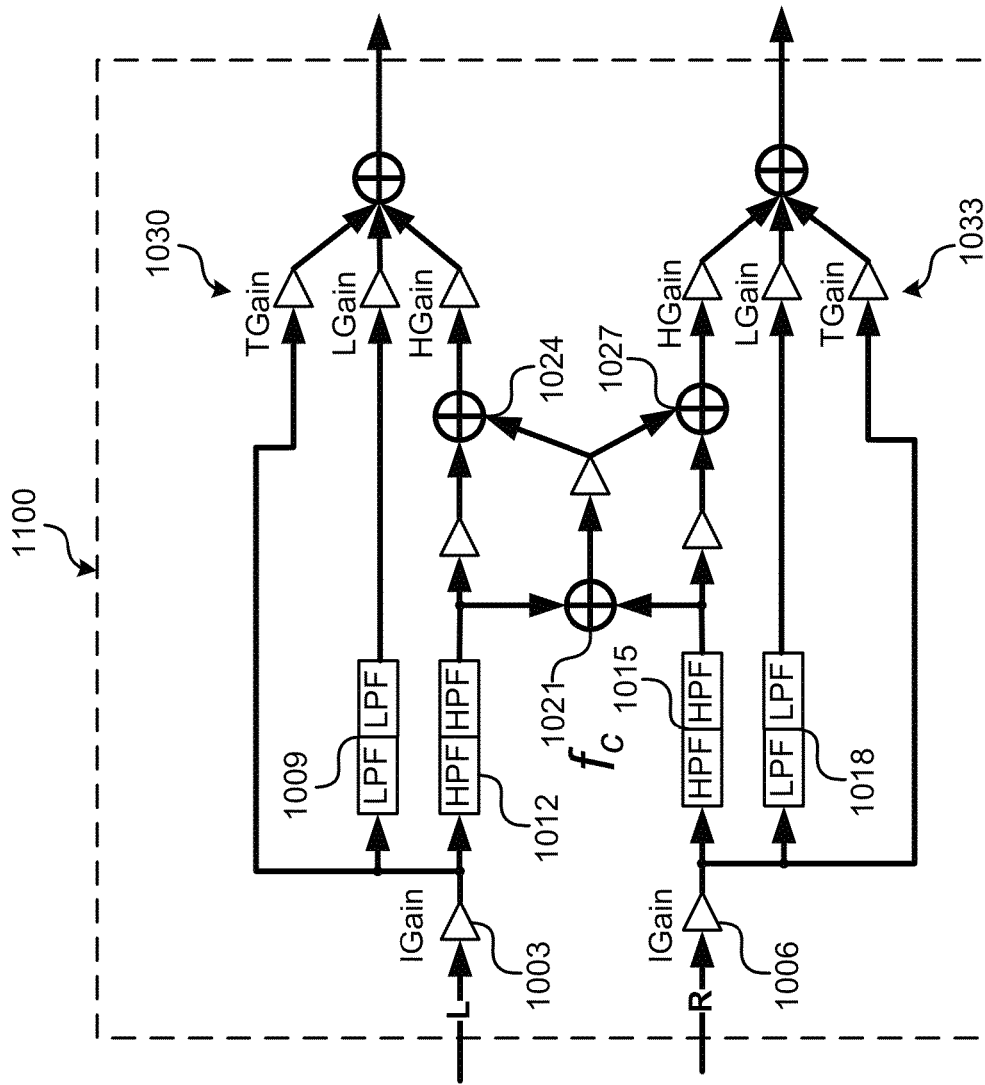
FIG. 10 is a block diagram illustrating an example audio enhancement component utilized in some embodiments of the technology disclosed herein.

FIG. 10 provides a block diagram of an example audio enhancement component 1000 that may be utilized as 3D audio enhancement component 821. Audio enhancement component 1000 is shown to comprise: multiple signal mixers 1021, 1024, and 1027; an initial gain amplifier (IGain) 1003; a low-pass filter 1009; and a high-pass filter 1012 for the left audio channel; and an initial gain amplifier (IGain) 1006, a low-pass filter 1018, and a high-pass filter 1015 for the right audio channel. After the initial gain by gain amplifiers 1003 and 1006 for the left and right audio channels respectively, low frequency audio signal via low-pass filter (1009, 1018), high frequency audio signal via high-pass filter (1012, 1015), and the original audio signal are each amplified (715, 718) and combined for each of the left and right audio channels.

Generally, in a two audio channel system, high frequency sounds that are present in one channel but not the other do not replicate real life. In real life, sounds heard by one's left ear are also heard by our right ear, but to a lesser degree. The same is true of sounds heard by one's right ear; the sound is heard at its highest level by our right ear, but also heard by our left ear. As such, to emulate real-world three-dimensional (3D) sound effect, in some embodiments, the audio enhancement component 1000 filters out the high frequency component of the left channel with high pass filter 1012 and the high frequency component of the right channel with high pass filter 1018 and then sums the two resulting signals together (at 1006). The low frequency component is also filtered out of the left and right channels by the low pass filters 1009 and 1015, respectively. This summed result of the high frequency component of both left and right channel is then summed individually with the left and right channels (at 701A and 701B, respectively). This effectively transfers some of the sounds unique to one side (e.g., left channel) to the opposite side (e.g., the right channel), thereby resulting in the sounds in the right channel being heard in the left channel to a lesser degree and vice versa. This produces the 3D sound effect. When the output signal is finally constructed with the amplifiers 715 and 718, HGain is set to the highest value for emphasis, and LGain is set to a value slightly lesser than HGain, and the signals are mixed with a small portion of the original signal (i.e., TGain).

Figure 17:
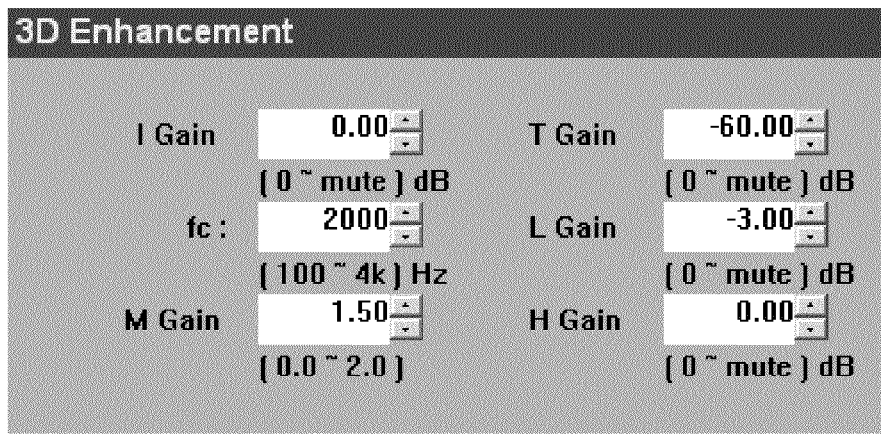

FIG. 17 is a screenshot of a software tool that illustrates example settings for 3D audio enhancement component 821 in accordance with one embodiment of the technology described herein. As illustrated in FIG. 17, to achieve a 3D effect from the left and right audio channels, the following is set for each of the left and right audio channels: the initial gain (IGain) is set to 0 dB, the total gain (TGain) is set to −60 dB, the low-gain is set to −3 dB, the high-gain is set to 0 dB, the middle-gain is set to 1.5 dB, and the center frequency (fc) is set to 2 kHz.

In FIG. 8, while the output of 7-band parametric equalizer 815 is enhanced by component 821, mono limiters 824 and 827 concurrently adjust the output of 5-band parametric equalizer 818. Mono limiters 824 and 827 limit the amplitude of the audio signal they receive and, subsequently, output the limited audio signal. Depending on the audio profile selected, mono limiters 824 and 827 may be used to clean up low frequency components of the left and right channels, thereby preserving directionality that is optimal in certain gaming situations where a user (e.g., player) is interested in where sounds in the game emanate from.

Figure 22:
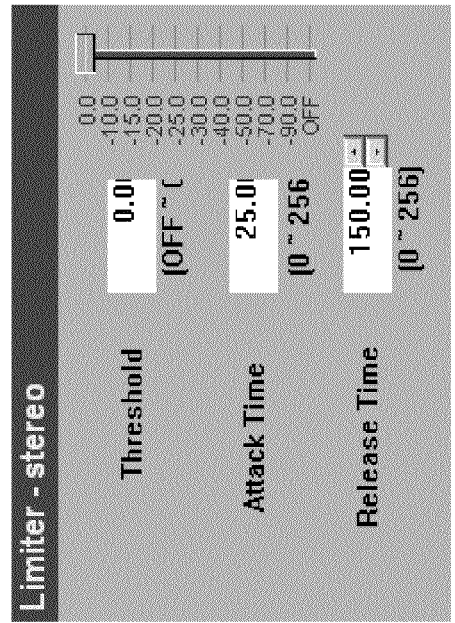

In the illustrated case, mono limiters 824 and 827 limit the left and right audio channels outputted by 5-band parametric equalizer 818. Example settings for mono limiters 824 and 827 are illustrated in FIG. 22, which provides a screen shot of a software tool for setting mono limiters. According to FIG. 22, the mono limiters 824 and 827 are set to a threshold limit of 0 dB, an attack time of 25 ms, and a release time of 150 ms.

Figure 11:
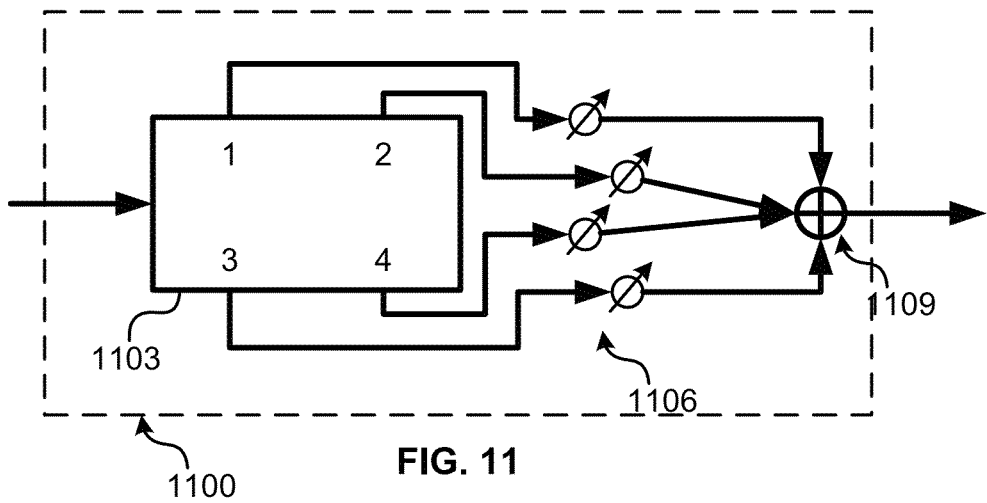
FIG. 11 is a block diagram illustrating an example phase shift and delay network utilized in some embodiments of the technology disclosed herein.

Algorithm 800 continues by phase shifting and delaying the left and right audio channels outputted by 3D audio enhancement component 821. According to some embodiments, a phase shift & delay mixers 830 and 833 are utilized to phase shift and delay the left and right audio channels. FIG. 11 is a block diagram illustrating an example phase shift and delay network 1100 that may be utilized as phase shift & delay mixers 830 and 833. As shown in FIG. 11, phase shift and delay network 1100 comprises: phase shifter component 1103, responsible for splitting a single audio channel to several audio channels having adjustable phases, and gain limiters 1106, for adjusting the gain of each of the 4 phase shifted signals prior to their summation at 1109. Accordingly, phase shift and delay network 1100 is able to take an input audio signal, separate the inputted audio signal into four signals, phase shift each of the channels, and then adjust the gain of each of the four phase shifted audio signals prior to summing all into a single output signal. In some embodiments, phase shift and delay network 1100 is intended to add natural echo components to the audio signal that would be similar to that which is perceived in real life.

Figure 18:
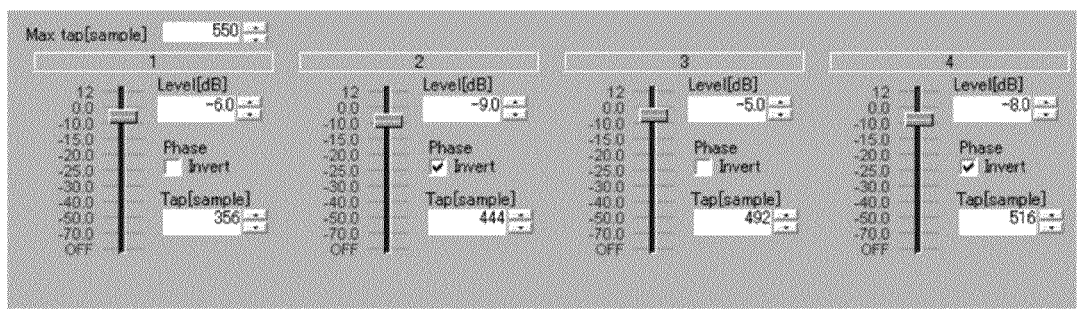
Figure 19:
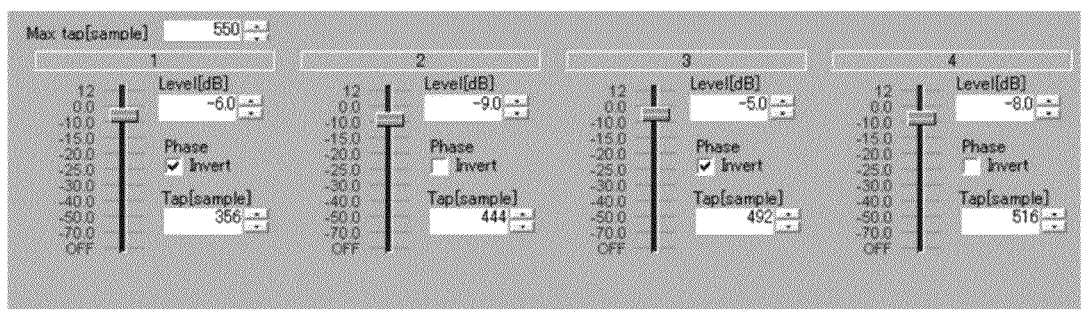

FIG. 18 provides a screen shot of a software tool for adjusting the settings of phase shift & delay mixer 830 for the left audio channel, and FIG. 19 provides a screen shot for adjusting the settings of phase shift & delay mixer 833 for the right audio channel. According to FIG. 18, channel #1 is set at −6 dB, channel #2 is set at −9 dB and inverted, channel #3 is set at −5 dB, and channel #4 is set at −8 dB and inverted. According to FIG. 19, channel #1 is set at −6 dB and inverted, channel #2 is set at −9 dB, channel #3 is set at −5 dB and inverted, and channel #4 is set at −8 dB.

Also depicted in FIGS. 18 and 19 are four taps that further direct the audio signal the phase shifter & delay mixers (830 and 833) receive. Each of the four taps has a first-in-first-out (FIFO) buffer having a maximum sample length (i.e., Max tap[sample]). In the case of FIGS. 18 and 19, the maximum sample length is shown set at 550 samples. Additionally, for each of the four taps, one can specify the sample in the FIFO buffer from where the each phase shift & delay mixers (830 and 833) will start reading. For example, in FIGS. 18 and 19, tap 1 is set to start reading from sample 356, tap 2 is set to start reading from sample 444, tap 3 is set to start reading from sample 492, and tap 4 is set to start reading from sample 516. The block samples the input signal continuously where the most recent sample shifts out the oldest one.

Figure 20:
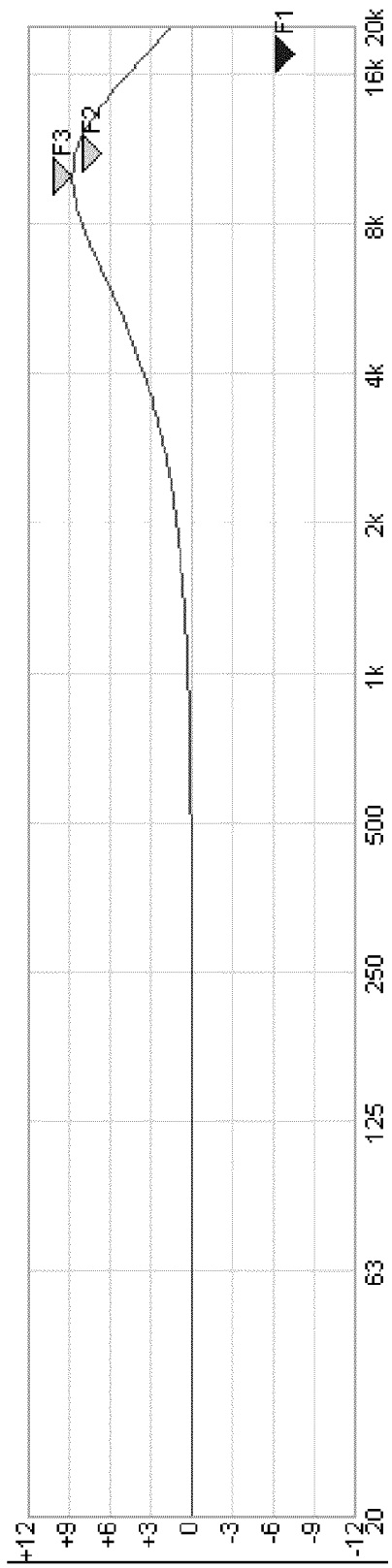

Continuing with algorithm 800, the left and right audio channel outputs of phase shift & delay mixers 830 and 833 are further adjusted by 3-band parametric equalizer 839. FIG. 20 is a graph illustrating example settings for band equalizer 839 for 3 bandwidths (i.e., F1-F3).

Figure 25:
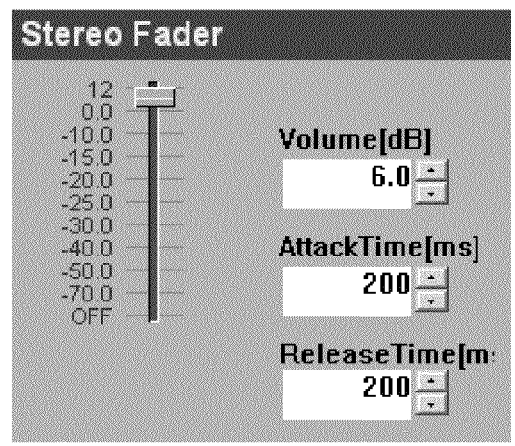

In FIG. 8, while the output of 3D audio enhancement component 821 is phase shifted and delayed by phase shift & delay mixers 830 and 833 and adjusted by 3-band parametric equalizer 839, stereo fader #3 (836) is applied to both the left and right audio channels outputted by mono limiters 824 and 827. Depending on the audio profile selected, fader #3 (836) may be used to as a bass level adjuster for both channels. For example, fader #3 (836) can be adjusted from OFF up to 12 dB. FIG. 25 is a screenshot of a software tool that illustrates example settings for stereo fader #3 (836) in accordance with one embodiment of the technology described herein. As illustrated in FIG. 25, stereo fader #3 (836) is set at a threshold volume of 6 dB, an attack time of 200 ms, and a release time of 200 ms.

Depending on the audio profile selected, phase shift & delay mixers 830 and 833 may be used on each channel to delay the signal, which is then phase shifted and mixed with the non-delayed signal. This effectively results in an echo effect in the user's ear. The echo effect may be used to achieve, for example, a perceived effect of separating the sound from the head to give the sensation of a more spacious sound environment.

Phase shift & delay mixers 830 and 833 phase shifts and delays the left and right channels outputted from 3D enhancement component 821. The phase shift and delay effectuated by phase shift & delay mixers 830 and 833 effectively emulates the phase shift that occurs when a real world sound is reflected back to the ear and becomes phase shifted on the way back.

With continued reference to FIG. 8, the results of 3D enhancement component 821, stereo fader #3 (836), and 3-band parametric equalizer 839 are eventually mixed by 3-way mixer 842 and 845. Depending on the audio profile selected, 3-band parametric equalizer 839 may be used on both left and right delayed signals to adjust the frequency of each.

Figure 21:
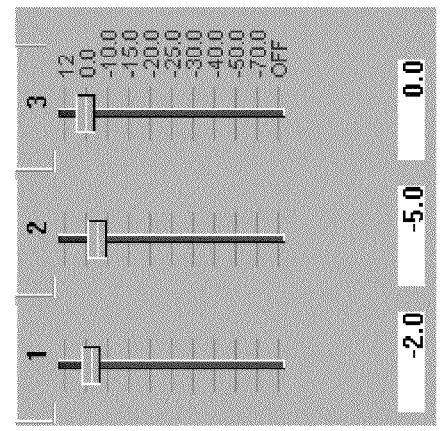
Figure 23:
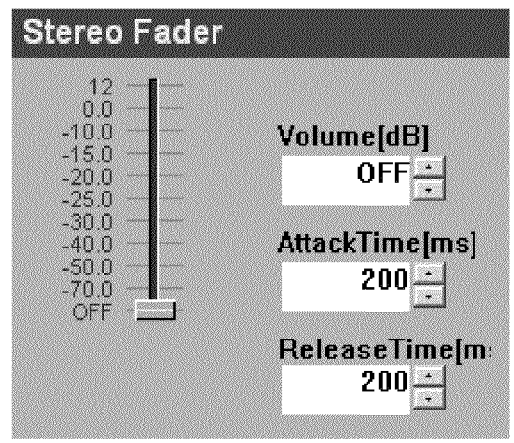
Figure 24:
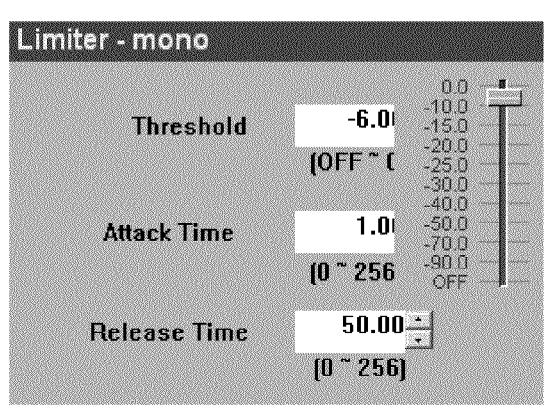

According to FIG. 21, which provides a screen shot of a software tool for adjusting the settings of 3-way mixers 842 and 845, the output of 3D enhancement component 821 at 2 dB, the output of 3-band parametric equalizer 839 −5 dB, and the output of stereo fader #3 (836) at 0 dB are mixed together for each of the left audio channel and the right audio channel.

Returning to FIG. 8, the outputs of 3-way mixer 842 and 845 is then limited by stereo limiter 848, which limits an audio signal once it passes a specified threshold. FIG. 22 is a screen shot of a software tool for adjusting the settings of stereo limiter 848. Depending on the audio profile selected, 3-way mixer 842 and 845 may be used to mix a non-delayed high/mid range frequency 3D enhanced audio signal, a delayed high/mid range frequency 3D enhanced audio signal, and a bass signal. According to the settings illustrated in FIG. 22, the settings of stereo limiter 848 are set at a threshold volume of 0 dB, an attack time of 25 ms, and a release time of 150 ms.

Figure 27:
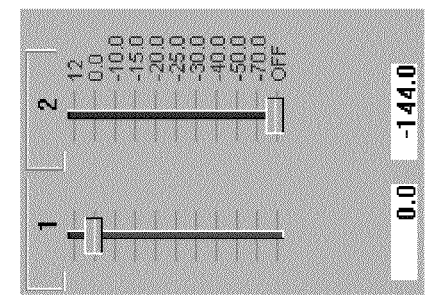
Figure 26:
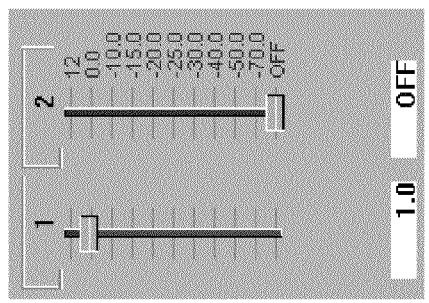

Algorithm 800 subsequently mixes the left and right audio channel outputs of stereo limiter 848 with the output of stereo fader #2 (809), as previously discussed herein. As illustrated in FIG. 8, 2-way mixers 854 and 851 facilitate this mixing for the left audio channel and the right audio channel respectively. FIGS. 26 and 27 provide a screen shot of a software tool for adjusting the settings of 2-way mixers 854 and 851. According to FIG. 26, the output of the left audio channel of stereo limiter 848 is mixed at 1 dB with the output of the left audio channel of stereo fader #2 809, which set at OFF. According to FIG. 30, the output of the right audio channel of stereo limiter 848 is set at OFF and mixed with the output of the right audio channel of stereo fader #2 809 at −144 dB.

Figure 29:
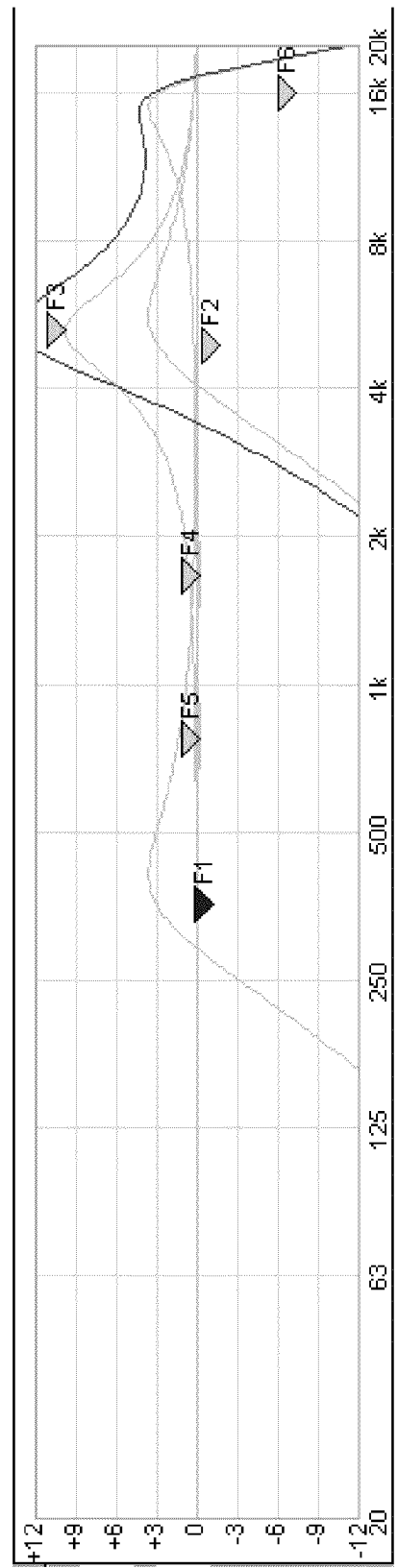

Continuing with algorithm 800, of 2-way mixers 854 and 851 are adjusted by 6-band parametric equalizer 857. Depending on the selected audio profile, 6-band parametric equalizer 857 may be used to provide additional flexibility in adjusting the resulting audio signal's frequency response post-algorithm. FIG. 29 is a graph illustrating example settings for band equalizer 857 for 6 bandwidths (i.e., F1-F6).

Figure 28:
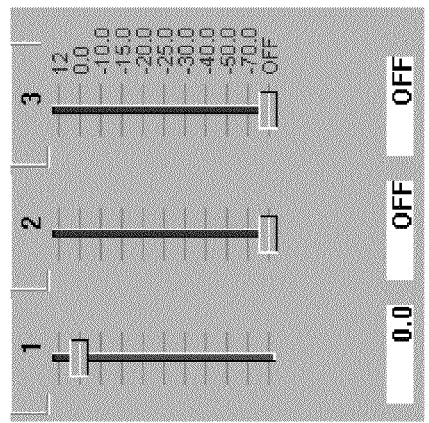

Subsequently, algorithm 800, using 3-way mixers 863 and 860, mixes the output of left and right audio channels of 6-band parametric equalizer 857 with the output of left and rights audio channels of stereo audio compressor 812, and the output of 2-ways mixers 854 and 851. Depending on the selected profile, mixers 863 and 860 may be used to provide to mix in various levels of each of the following signals at the output: original compressed stereo signal, pre-equalizer algorithm processed signal, and the post-equalizer algorithm processed signal FIG. 28 provides a screen shot of a software tool for adjusting the settings of 3-way mixers 863 and 860. According to FIG. 28, both 3-way mixer 863 and 3-way mixer 860 are set to mix their respective audio channel such that the output of the 2-way mixers at 0 dB is mixed with the other two inputs (stereo audio compressor 812 and 6-band parametric equalizer 857) set to OFF.

It should be understood that the foregoing setting and arrangement for algorithm 800 could differ amongst embodiments of the technology described herein, and could be adjusted differently to provide alternative or additional enhancements to audio outputted to the speakers of the audio headset system.

Figure 12A:
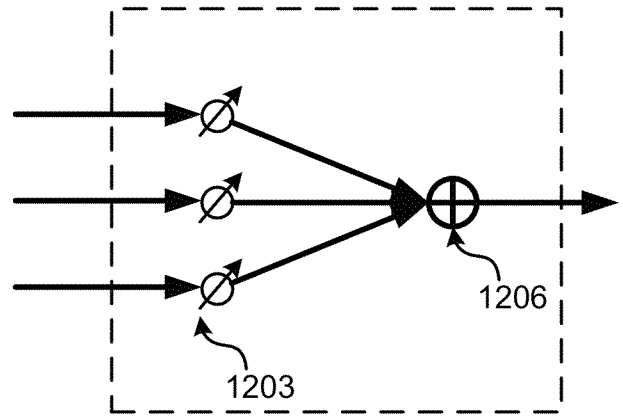
FIGS. 12A and 12B are block diagrams illustrating example mixer networks utilized in some embodiments of the technology disclosed herein.
Figure 12B:
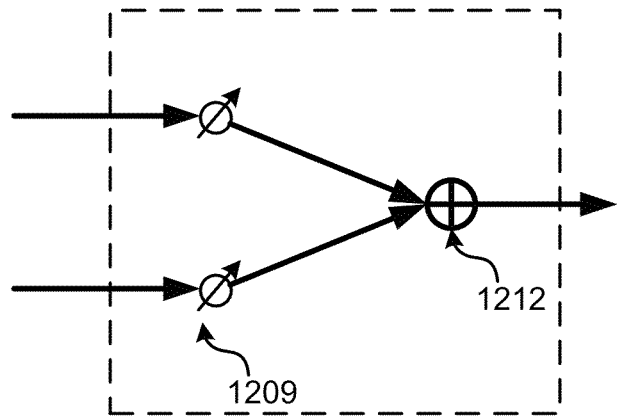

FIGS. 12A and 12B are block diagrams illustrating example mixer networks utilized in some embodiments of the technology described herein. Specifically, FIG. 12A illustrates an example 3-way mixer comprising 3 amplitude adjustors 1203 with a mixer 1209, thereby allowing the mixer to selectively adjust the amplitude of three audio signals prior to mixing (i.e., combining) them. FIG. 12B illustrates an example 2-way mixer comprising 2 amplitude adjustors 1206 with a mixer 1212, thereby allowing the mixer to selectively adjust the amplitude of two audio signals prior to mixing (i.e., combining) them.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 30:
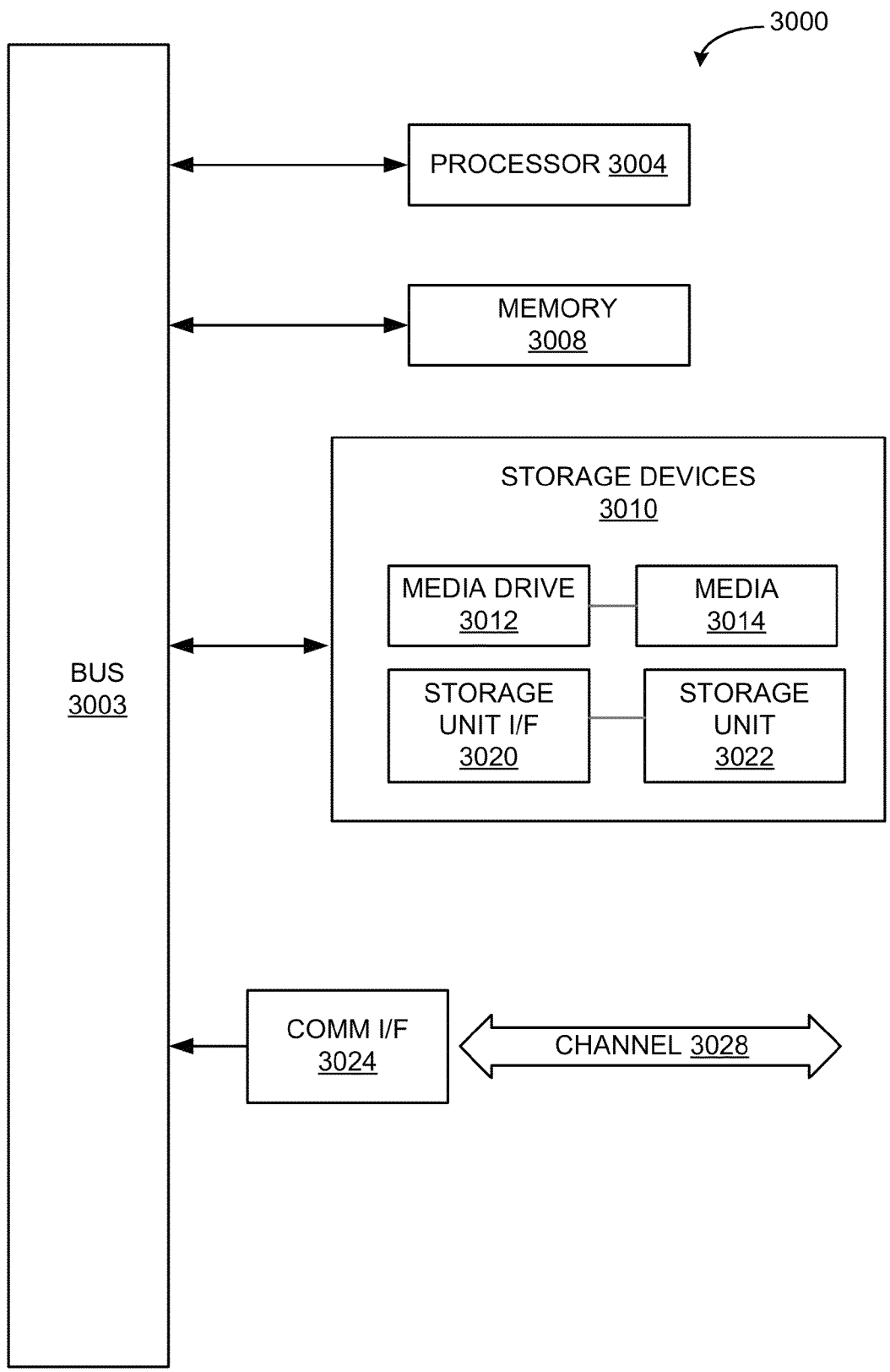
FIG. 30 illustrates an example computing module for implementing various components of embodiments of the technology disclosed herein or for use with various embodiments of the technology disclosed herein.

As used herein, the term module might describe a given unit of functionality that can be performed in accordance with one or more embodiments of the technology described herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology described herein are implemented in whole or in part using software, in one embodiment, these software elements can be implemented to operate with a computing or processing module capable of carrying out the functionality described with respect thereto. One such example computing module is shown in FIG. 30. Various embodiments are described in terms of this example-computing module 3000. After reading this description, it will become apparent to a person skilled in the relevant art how to implement the technology described herein using other computing modules or architectures.

Referring now to FIG. 30, computing module 3000 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 3000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 3000 might include, for example, one or more processors, controllers, control modules, or other processing devices, such as a processor 3004. Processor 3004 might be implemented using a general-purpose or special-purpose processing engine such as, for example, a microprocessor, controller, or other control logic. In the illustrated example, processor 3004 is connected to a bus 3002, although any communication medium can be used to facilitate interaction with other components of computing module 3000 or to communicate externally.

Computing module 3000 might also include one or more memory modules, simply referred to herein as main memory 3008. For example, preferably random access memory (RAM) or other dynamic memory, might be used for storing information and instructions to be executed by processor 3004. Main memory 3008 might also be used for storing temporary variables or other intermediate information during execution of instructions to be executed by processor 3004. Computing module 3000 might likewise include a read only memory ("ROM") or other static storage device coupled to bus 3002 for storing static information and instructions for processor 3004.

The computing module 3000 might also include one or more various forms of information storage mechanism 3010, which might include, for example, a media drive 3012 and a storage unit interface 3020. The media drive 3012 might include a drive or other mechanism to support fixed or removable storage media 3014. For example, a hard disk drive, a floppy disk drive, a magnetic tape drive, an optical disk drive, a CD or DVD drive (R or RW), or other removable or fixed media drive might be provided. Accordingly, storage media 3014 might include, for example, a hard disk, a floppy disk, magnetic tape, cartridge, optical disk, a CD or DVD, or other fixed or removable medium that is read by, written to or accessed by media drive 3012. As these examples illustrate, the storage media 3014 can include a computer usable storage medium having stored therein computer software or data.

In alternative embodiments, information storage mechanism 3010 might include other similar instrumentalities for allowing computer programs or other instructions or data to be loaded into computing module 3000. Such instrumentalities might include, for example, a fixed or removable storage unit 3022 and an interface 3020. Examples of such storage units 3022 and interfaces 3020 can include a program cartridge and cartridge interface, a removable memory (for example, a flash memory or other removable memory module) and memory slot, a PCMCIA slot and card, and other fixed or removable storage units 3022 and interfaces 3020 that allow software and data to be transferred from the storage unit 3022 to computing module 3000.

Computing module 3000 might also include a communications interface 3024. Communications interface 3024 might be used to allow software and data to be transferred between computing module 3000 and external devices. Examples of communications interface 3024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 3024 might typically be carried on signals, which can be electronic, electromagnetic (which includes optical) or other signals capable of being exchanged by a given communications interface 3024. These signals might be provided to communications interface 3024 via a channel 3028. This channel 3028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 3008, storage unit 3020, media 3014, and channel 3028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 3000 to perform features or functions of the present technology as discussed herein.

While various embodiments of the present technology have been described above, it should be understood that they have been presented by way of example only, and not of limitation. Likewise, the various diagrams may depict an example architectural or other configuration for the technology described herein, which is done to aid in understanding the features and functionality that can be included in the technology described herein. The present technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present technology. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the technology described herein, whether or not such embodiments are described and whether or not such features are presented as being a part of a described embodiment. Thus, the breadth and scope of the present technology should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An audio headset system, comprising an audio headset, the audio headset comprising:
    a memory storing a plurality of audio profiles, each of the plurality of stored audio profiles associated with a video game and specifying how to mix, delay, and phase shift a source audio;
    an input device configured to allow a user of the audio headset to select one of the plurality of stored audio profiles;
    a speaker;
    a signal processor configured to process source audio received from an audio source, to produce processed audio from the source audio, and to output the processed audio to the speaker; and
    a control unit configured to control operation of the signal processor according to a selected one of the plurality of audio profiles, wherein based on the selected audio profile the control unit causes the signal processor to selectively mix, delay, phase shift, and equalize the source audio, thereby producing processed audio.

2. The audio headset system of claim 1, wherein the audio source is a gaming console.

3. The audio headset system of claim 1, wherein selectively mixing, delaying, phase shifting, and equalizing, comprises:
    equalizing a frequency response characteristic of a band in the source audio according to the selected audio profile, thereby producing a first equalized audio;
    filtering and mixing the first equalized audio according to the selected audio profile, thereby producing a first mixed audio;
    delaying and phase shifting the first mixed audio according to the selected audio profile, thereby producing a first delay shifted audio;
    equalizing a second frequency response characteristic of a second band in the first delay shifted audio according to the selected audio profile, thereby producing a second equalized audio;
    mixing the second equalized audio, thereby producing a second mixed audio;
    equalizing a third frequency response characteristic of a third band in the second mixed audio, thereby producing a third equalized audio; and
    mixing the third equalized audio, thereby producing the processed audio.

4. The audio headset system of claim 1, wherein the audio source is a game console and the audio headset is configured to connect to be entirely powered by the gaming console.

5. The audio headset system of claim 1, wherein the audio profile causes the signal processor to provide three-dimensional audio through the processed audio.

6. The audio headset system of claim 1, wherein the source audio comprises a plurality of audio channels and the processed audio comprises a left processed audio channel and a right processed audio channel.

7. The audio headset system of claim 1, wherein the speaker includes a left speaker and a right speaker, and the processed audio comprises a left processed audio channel to be outputted to the left speaker, and a right processed audio channel to be outputted to the right speaker.

8. The audio headset system of claim 1, further comprising a microphone.

9. The audio headset system of claim 8, wherein the signal processor is further configured to relay microphone audio from the microphone to a game console.

10. The audio headset system of claim 9, wherein the audio headset system is configured to connect to a game controller that is in communication with the gaming console, and wherein the control unit is further configured to detect when the audio headset system is connected to the game controller, and instruct the signal processor to relay microphone audio from the microphone to the game console via the game controller.

11. The audio headset system of claim 8, wherein the signal processor is further configured to process microphone audio from the microphone before relaying the microphone audio to a game console.

12. The audio headset system of claim 1, wherein the signal processor is further configured to relay chat audio from the game console to the speaker.

13. The audio headset system of claim 11, wherein the audio headset system is configured to connect to a game controller that is in communication with the gaming console, and wherein the control unit is further configured to detect when the audio headset system is connected to the game controller, and instruct the signal processor to mix chat audio with processed audio before the processed audio is output to the speaker.

14. The audio headset system of claim 1, further comprising an input component configured to allow a user to enable or disable application of an audio profile.

15. The audio headset system of claim 1, further an auxiliary audio input configured to receive a secondary source audio and output the secondary source audio to the speaker as unprocessed audio.

16. The audio headset system of claim 1, further comprising a display configured to display operational parameters of the audio headset system.

17. The audio headset system of claim 1, wherein the signal processor is a first signal processor and the audio headset system further comprises a second signal processor configured to receive digital audio from the audio source, decode the digital audio to analog audio, and output the analog audio to the first signal processor as source audio.

18. The audio headset system of claim 17, further comprising a receiver unit connected to the headset, wherein the receiver unit comprises the second signal processor.

19. The audio headset system of claim 17, wherein the control unit is further configured to control operation of the second signal processor.

20. The audio headset system of claim 17, wherein the receiver unit further comprises a second control unit that is configured to control operation of the second signal processor.

21. The audio headset system of claim 1, wherein the input device comprises a button, switch, knob, touchpad, or touchscreen.

22. A gaming audio headset, comprising:
- a speaker;
- a microphone;
- a memory storing a plurality of audio profiles, each of the plurality of stored audio profiles associated with a video game and specifying how to mix, delay, and phase shift a source audio;
- an input device configured to allow a user of the audio headset to select one of the plurality of audio profiles stored in the memory;
- a signal processor configured to process source audio received from a game console, to produce processed audio from the source audio, to output the processed audio to the speaker, relay microphone audio from the microphone to the game console, and to mix chat audio from the game console into the processed audio before it is output to the speaker; and
- a control unit configured to control operation of the signal processor according to a selected one of the plurality of audio profiles, wherein based on the selected audio profile the control unit causes the signal processor to selectively mix, delay, phase shift, and equalize the source audio, thereby producing the processed audio.

23. A method, comprising:
- storing a plurality of audio profiles in a memory of an audio headset, each of the plurality of stored audio profiles associated with a video game and specifying how a signal processor of the audio headset mixes, delays, phase shifts, or equalizes source audio;
- receiving at an input device of the audio headset user input selecting one of the plurality of stored audio profiles;
- receiving, at the signal processor of the audio headset, source audio from an audio source;
- processing the audio at the signal processor according to the selected audio profile, wherein based on the selected audio profile the signal processor selectively mixes, delays, phase shifts, or equalizes the source audio, thereby producing processed audio; and
- providing the processed audio for audio output by a speaker of the audio headset.

* * * * *